(12) United States Patent
Mamei et al.

(10) Patent No.: US 9,090,239 B2
(45) Date of Patent: Jul. 28, 2015

(54) HYDRAULIC VALVE

(75) Inventors: Enrico Mamei, Modena (IT); Eronne Mamei, Modena (IT); Omer Mamei, Cognento (IT)

(73) Assignee: STUDIO TECNICO 6M S.R.L., Modena (IT)

( * ) Notice: Subject to any disclaimer, the term of this patent is extended or adjusted under 35 U.S.C. 154(b) by 0 days.

(21) Appl. No.: 13/569,799

(22) Filed: Aug. 8, 2012

(65) Prior Publication Data

US 2012/0298231 A1   Nov. 29, 2012

Related U.S. Application Data

(62) Division of application No. 12/308,886, filed as application No. PCT/IB2007/001779 on Jun. 28, 2007, now abandoned.

(30) Foreign Application Priority Data

Jun. 28, 2006  (IT) .............................. MO2006A0213
Jun. 21, 2007  (IT) .............................. MO2007A0212

(51) Int. Cl.
  *B60T 11/21*   (2006.01)
  *B60T 17/22*   (2006.01)
  *B60T 13/14*   (2006.01)
  *B60T 11/20*   (2006.01)

(52) U.S. Cl.
  CPC ............... *B60T 17/221* (2013.01); *B60T 11/21* (2013.01); *B60T 13/14* (2013.01); *B60T 11/203* (2013.01); *Y10T 137/87249* (2015.04)

(58) Field of Classification Search
  CPC ................................ B60T 11/21; B62D 11/08
  USPC ............... 303/189, 9.61, DIG. 10, 9.62, 9.65, 303/9.71, 9.74, 9.75, 186, 187, 188; 188/354, 16, 349; 280/264; 137/597
  See application file for complete search history.

(56) References Cited

U.S. PATENT DOCUMENTS

| | | | | |
|---|---|---|---|---|
| 2,887,187 | A * | 5/1959 | Fletcher et al. | 188/358 |
| 3,568,441 | A * | 3/1971 | Walker | 60/581 |
| 3,640,067 | A * | 2/1972 | Ingram | 60/561 |
| 3,834,769 | A * | 9/1974 | Just | 303/9.61 |
| 3,863,991 | A * | 2/1975 | Wilson | 303/9.61 |
| 3,885,391 | A * | 5/1975 | Campbell et al. | 60/581 |
| 4,178,757 | A * | 12/1979 | Ketterling et al. | 60/548 |
| 4,408,805 | A * | 10/1983 | Edwards et al. | 303/9.61 |
| 4,463,562 | A * | 8/1984 | Taft | 60/555 |
| 4,547,967 | A * | 10/1985 | Reynolds et al. | 303/7 |
| 4,702,330 | A * | 10/1987 | Vatter et al. | 180/6.2 |
| 4,953,917 | A * | 9/1990 | Wittich | 303/9.61 |
| 6,217,128 | B1 * | 4/2001 | Tillman, Jr. | 303/9.61 |
| 6,609,370 | B2 * | 8/2003 | Batchelor | 60/547.2 |
| 6,616,246 | B1 * | 9/2003 | Williamson et al. | 303/9.62 |
| 6,729,132 | B2 * | 5/2004 | Batchelor et al. | 60/547.1 |
| 7,178,884 | B2 * | 2/2007 | Vandendriessche et al. | 303/191 |
| 7,942,482 | B2 * | 5/2011 | Mies | 303/9.61 |

* cited by examiner

*Primary Examiner* — Thomas Irvin
(74) *Attorney, Agent, or Firm* — Young & Thompson

(57) ABSTRACT

A hydraulic valve suitable for operating apparatus (500) of brakes of wheels of a vehicle includes body means (2) having first inlet means (21), second inlet means (22) that are connected to respective supply apparatus (23; 24) of pressurized fluid, first outlet means (25) and second outlet means (26); first distributing means and second distributing means (5) arranged to connect the first inlet means (21) to the first outlet means (25) and second inlet means (22) to the second outlet means (26) respectively, first thrust means (7) and second thrust means (8) arranged to operate the first distributing means (5) and second distributing means (6) respectively, and a hydraulic connection between said first distributing means (5) and second distributing means (6) so that the first distributing means (5) act on the second distributing means (6) and vice versa.

25 Claims, 17 Drawing Sheets

HYDRAULIC VALVE

TECHNICAL FIELD

The invention relates to an hydraulic valve suitable for operating apparatus of brakes of wheels of a vehicle.

BACKGROUND OF THE INVENTION

It is known that the operating machines used mainly in the agricultural sector or on building sites is equipped with two separate brake circuits that can activate the brakes of the rear wheels on the left and right-hand sides independently and which are each operated by separate pedals, both of which are located in the driving position.

This feature is used by drivers to take the operating machine around turns quickly and with a very limited radius of curvature: the driver basically presses the brake pedal that faces the direction of bending, by braking or blocking the rear wheel of the side of the machine facing this direction. The rear wheel of the other side continues to drive the machine, which therefore basically turns on itself around the braking wheel, moving progressively in the direction of bending.

Nevertheless, the two brake circuits must also brake the operating machine when it is moving along a road that is open to traffic for normal transport, slowing it down or blocking its movement as necessary.

In order to obtain this action, the driver has to simultaneously press both pedals controlling the respective brake circuits, so that the braking action takes place on the wheels of both sides of the operating machine equally.

In order to facilitate the driver's action, the pedals can also be joined together using removable devices which are only used when on the road and which are removed when the machine has to operate on sites or in fields.

There must not be any imbalance in the power of the braking action on the two sides of the operating machine during transportation as on roads with normal traffic the machine is capable of reaching notable speeds of around 40/50 km/hr, and an imbalance, that is a stronger braking action on one side than on the other, may cause the operating machine to swerve dangerously.

Imbalances in the braking power can be caused by a variety of elements that make up the braking system on an operating machine.

One of the elements that can cause an imbalance between one brake circuit and the other is the manufacturing tolerance of the individual components on each circuit, in particular the machining on the bodies of the pumps or the selector valves, the sliders and the ports through which the pressurised oil that operates the brakes flows.

Other elements that may cause an imbalance are the springs used in the pumps and the valves, springs which may have a slightly different modulus of elasticity from one another even if the springs on one brake circuit and on the other brake circuit are substantially the same as one another.

A further element that can cause braking imbalance is imperfect alignment of the pedals controlling each brake circuit on the operating machine, alignment which must be as precise as possible when braking on the road.

Another feature that is required of the braking systems of operating machines is that they be easy to operate, as similar as possible to those on a normal car.

Basically, the stroke of the pedals controlling the brake circuits must be considerably limited and the force that the driver has to apply to the pedals must be limited and easy to adjust.

At present, pumps which move considerable amounts of pressurised oil are used to limit the stroke of the brake pedals.

However, the drawback with using this type of pump is that a considerable physical effort is required of the driver in order to move this amount of oil and thus operate the brakes.

Servo-controls are therefore fitted onto the brake circuits in order to limit the force that has to be applied to the pedals. These magnify the force applied by the driver, but have the further drawback of being very expensive, thus increasing the costs of producing and purchasing operating machines.

As an alternative to fitting servo-controls, pumps are also used to limit the operating force on the pedals. These move limited amounts of oil, but this solution has the further drawback of increasing the stroke that the pedals have to complete in order to operate the brakes efficiently.

In order to compensate the pressure differences that can form between the two brake circuits, structural solutions are adopted which require a pump to be fitted on each of the two brake circuits respectively: the pumps are positioned in parallel to one another and reciprocal connection ducts are provided between them that allow the two pumps to communicate with one another or they can be isolated using opening and closing devices that are controlled by the pump pistons during their stroke.

According to a further well-known technical solution, an automatic pressure or displacement compensation device is arranged between the brake circuits which comprises a cylinder whose ending parts are connected to each brake circuit via respective ducts and inside which there is a chamber in which a central piston moves in contrast to elastic members; the central piston divides the chamber into two semi-chambers and, moved by the thrust of the higher pressure present in one circuit than the other, it slides in order to adjust the volumes of the semi-chambers and thus compensate the pressure between the two circuits.

In order to overcome the drawbacks found with the specific use of pumps, for some time now preference has been for the use of braking systems with selector valves which distribute pressurised oil supplied from a source, for example an accumulator.

In this case, the amount of oil moved in the brake circuits is unrelated to the dimensions of the selector valves used and these do not have to push the pressurised oil towards the brake circuits, but simply distribute it towards it: as a result, both the pedal strokes and the force that must be applied to the brake pedals are significantly lower than is required if pumps are used.

A well-known braking system that comprises two hydraulic circuits that can be operated independently from one another or jointly has a selector valve fitted on both the right-hand and on the left-hand circuit of an operating machine.

This solution enables to obtain short brake pedal strokes and the limited operating force that is typical of selector valves, but has the drawback of not providing any certainty as regards the strength of the braking power produced by the left and right circuits of the operating machine when the driver operates the brake pedals to brake on the road; therefore braking imbalances which cause swerving may also occur with this technical solution.

According to a further well-known technical solution, the brake pedals can jointly or individually operate a single pressure-modulating device positioned between the two brake circuits. It receives pressurised oil from an accumulator and sends it to both brake circuits of the operating machine by means of respective elements which open or close the passage of pressurised oil to the individual circuits.

The drawback of this known technical solution is that, if a leak accidentally occurs in just one of the two brake circuits, all of the oil pressure is discharged towards the exterior and the braking action is completely missed, causing serious danger.

According to another braking system for two parallel circuits two pressure-modulating devices are used, positioned in parallel and connected to one another via pressure ducts and/or valves; each modulating device can be operated individually using its respective pedal to operate the respective brake circuit and thus turn the operating machine.

When both pedals are operated together and both modulators are thus activated, the pressure that reaches the brakes is the highest pressure generated by the two modulators.

The oil in the two brake circuits is mixed between the two modulators and between the pressure ducts or valves connecting them.

Again, the drawback of this solution is that, as the modulators are connected to one another, in the event of an oil leak from one of the circuits the oil is lost from both, and the braking action is also missed.

Further to what has already been stated, in vehicles that are also equipped with brakes on the front wheels, the braking units on the front wheels are supplied, by means of a valve known as a reverse selector valve, by the two hydraulic circuits which control the respective brakes on the rear wheels.

The aim of this valve is to connect the brakes on the front wheels to the hydraulic circuit controlling the brakes of the rear wheels in which the oil pressure is lower; thus, if the driver operates both brake pedals, those operating the front wheels are also operated whereas, if just one pedal is operated and just one hydraulic circuit controlling the brakes on just one of the rear wheels is activated as a result, the brakes on the front wheels are connected to the inactive hydraulic circuit and thus also remain inactive.

The drawback of this solution is that if there is a breakage or oil leak in one of the hydraulic circuits controlling the rear wheels, the brakes of the front wheels cannot be operated either and the braking action only takes place on one rear wheel, thus unbalancing the vehicle.

Moreover, a further drawback is that if both pedals and therefore both brakes of the rear wheels are operated, but the pressure in one of the hydraulic circuits controlling the rear wheels is lower than in the other, there is a considerable delay in the operation of the brakes of the front wheels.

OBJECTS OF THE INVENTION

One object of the invention is to improve the prior state of the art.

A further object of the invention is to make a hydraulic valve which allows selector valves to be used in the brake circuits of an operating machine, thus obtaining limited pedal strokes in terms of length and limited operating forces.

Another object of the invention is to make a hydraulic valve which allows equal braking power to be obtained on both brake circuits of an operating machine, automatically compensating for any differences in pressure produced by structural elements of the valves and the circuits.

Another object of the invention is to make a hydraulic valve which enables an active braking action to be maintained even if there is a leak of pressurised oil in one of the two circuits of an operating machine.

Another object of the invention is to make a hydraulic valve which allows to choose to operate the brakes of the front wheels only when necessary, i.e. only if both pedals controlling the brakes on the rear wheels are pressed during road transportation or, on the contrary, that allows to choose not to operate the brakes of the front wheels if the driver only operates one of the pedals controlling the brakes of the rear wheels when the vehicle is working, for example, on a building site.

Another object of the invention is to make a hydraulic valve which, in the event that there is an oil leak in one of the hydraulic circuits controlling the brakes of the rear wheels, as well making it possible to operate the brakes of the rear wheel controlled by the intact hydraulic circuit, also makes it possible to operate the brakes of one of the front wheels as well, specifically of the front wheel positioned opposite the braking rear wheel in order to obtain a crosswise braking action keeping the vehicle substantially balanced.

According to one aspect of the invention, an operating apparatus is provide for suitable for operating first brakes of a front axle and second brakes of a rear axle of a vehicle comprising: first circuit means and second circuit means arranged to supply said first and second brakes with pressurised fluid; first distributing means located between said first circuit means and said second circuit means; supply means for said pressurised fluid; valve means for sending said pressurised fluid to said first circuit and second circuit, characterised in that second distributing means are arranged between said first distributing means and said first brakes and second brakes to deactivate said first distributing means in the event of a malfunction of either said first circuit means or second circuit means and to connect said supply means with said first brakes or with said second brakes.

According to another aspect of the invention, a hydraulic valve is provided for suitable for operating apparatus suitable for operating first brakes of wheels on front axles and second brakes of wheels on rear axles of a vehicle, comprising: body means having first inlet means, second inlet means, first outlet means and second outlet means; first distributing means and second distributing means arranged to connect said first inlet means with said first outlet means and second inlet means with said second outlet means respectively, first thrust means and second thrust means arranged to operate said first distributing means and second distributing means respectively, characterised in that between said first distributing means and second distributing means there is a hydraulic connection so that said first distributing means act on said second distributing means and vice versa.

According to a further aspect of the invention, a hydraulic valve is provided for suitable for operating apparatus for brakes of wheels on front axles and brakes of wheels on rear axles of a vehicle, comprising: body means having first inlet means, second inlet means, first outlet means and second outlet means; first distributing means and second distributing means arranged to connect said first inlet means with said first outlet means and second inlet means with said second outlet means respectively, first thrust means and second thrust means arranged to operate said first distributing means and said second distributing means respectively, characterised in that between said first distributing means and second distributing means there is a hydraulic connection so that said first distributing means act on said second distributing means and vice versa, and also characterised in that there are third outlet means in said body means that can be connected to said second inlet means and fourth outlet means that can be connected to said first inlet means in such a way as to selectively operate said brakes on the axles of front wheels.

The invention thus allows a hydraulic valve to be made which enables:

operating two parallel brake circuits of an operating machine with a limited brake operating pedal stroke and with limited force required to operate the pedals; and obtaining a balanced braking action on the wheels on both sides of the operating machine without any imbalance being created between one side and the other; and controlling the brakes of the front wheels as well without having to install further valves.

BRIEF DESCRIPTION OF THE DRAWINGS

Further characteristics and advantages of the invention will appear even more evident from the detailed description of an operating apparatus, suitable for operating the brakes of a front axle and a rear axle of operating machines, illustrated by way of non limiting example in the accompanying drawings, wherein.

EMBODIMENTS OF THE INVENTION

Figure 1:
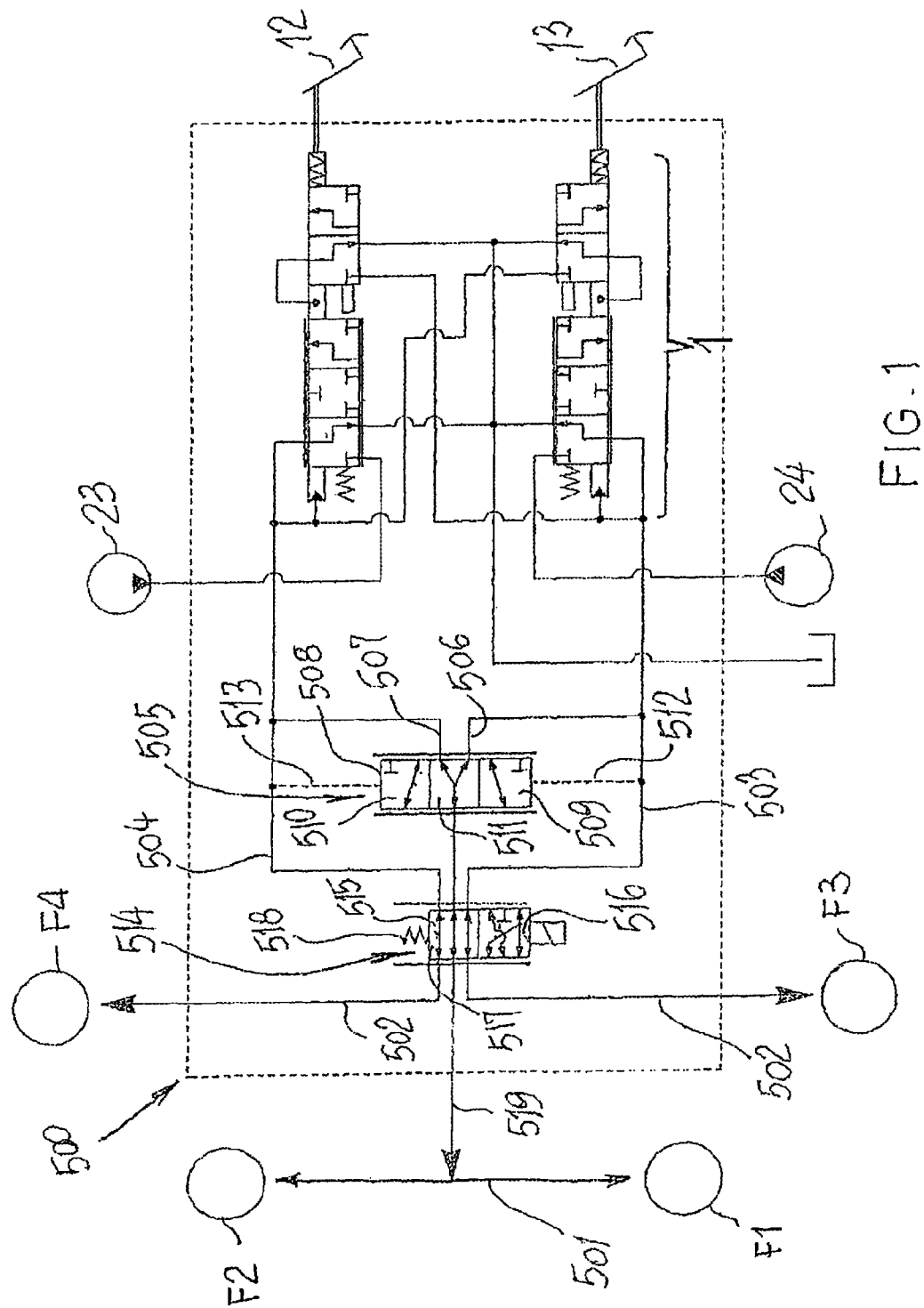
FIG. 1 is a hydraulic diagram of an operating apparatus suitable for operating first brakes on a front axle and second brakes on a rear axle of a vehicle in a normal operating condition.

With reference to FIGS. 1-4, 500 indicates an operating apparatus suitable for operating the brakes of wheels of a vehicle positioned on a front axle 501 and on a rear axle 502 of a vehicle, for example, an operating machine for agricultural work.

The apparatus 500 comprises a first mesh 503 and a second, parallel mesh 504 which are connected to a hydraulic valve 1 and to two elements 23 and 24 containing pressurised oil, basically two accumulators, which supply the first mesh 503 and the second mesh 504 with the pressurised oil.

Between the latter first distributing means 505 are positioned, having two inlet paths 506 and 507 and a slider 508 sliding between three positions, indicated by 509, 510 and 511 respectively; the movements of the slider 508 are caused by differences in pressure which act on the ending parts of the slider itself via two paths 512 and 513 indicated in the figures by the dashed line and which connect the ending parts of the slider 508 to the first mesh 503 and to the second mesh 504.

Between the latter and the brakes of the wheels on the front axle 501 and rear axle 502 are second distributing means 514 which are also equipped with a slider 515 sliding between two positions 516 and 517.

The slider 515 is operated by a control positioned near a vehicle's drive position so that it can be manoeuvred by the driver and it slides against a elastic member 518.

As can be seen in the drawings, the hydraulic valve 1 is operated by means of two pedals 12 and 13 which are also installed in the vehicle's drive position.

The hydraulic valve 1 comprises a body 2 in which are obtained a first sliding chamber 3 and a second sliding chamber 4 inside which a first and a second slider 5 and 6 are fitted sliding respectively and, coaxially to these, a corresponding first thrust unit 7 and second thrust unit 8.

Both the first sliding chamber 3 and the second sliding chamber 4 have two respective equal sections of different diameters which are connected to one another by means of a shoulder 300: respectively a first section 3' with larger diameter and a second section 3" with smaller diameter and a corresponding first section 4' larger in diameter and a second section 4" smaller in diameter; two respective concordant ending parts 203 and 204 of the sections 3" and 4" are closed with caps 9 and two opposite ending parts 103 and 104 are open to allow the passage towards the outside of the body 2 of two push rods and 11 which are part of the first and the second thrust unit 7 and 8 and which are arranged to be connected to two brake pedals indicated schematically by 12 and 13.

The first and second thrust units 7 and 8 are located in the respective sections 3' and 4' and comprise, as well as the push rods 10 and 11, a series of concentric springs, 14 and 14' inner, 15 and 15' intermediate, 16 and 16' outer respectively, the latter having a return function.

In more detail, the push rods 10 and 11 are shaped so as to form respective convex portions 110 and 111 which stretch out towards the outside of the body 2 through the open ending parts 103 and 104, and respective concave portions 210 and 211 which face the inside of the respective first and second sliding chambers 3 and 4, arranged to house the ending parts of the inner springs 14, 14' and intermediate springs 15, 15' whereas the ending parts of the outer springs 16, 16' rest on the edges of the ending parts of push rods 10 and 11 and on respective support rings 116 and 117 fitted inside the sections 3' and 4' of the parallel seats.

In order to keep the inner 14 and intermediate 15 springs in position, both the concave portions 210 and 211 and the concurrent ending parts of the sliders 5 and 6 are provided with spring-guide elements 17 and 17'.

Between the concave portions 210 and 211 and the sections 3' and 4' that these are fitted into in order to slide axially, are sealing means 18, 18' comprising ring-shaped gaskets 19, 19' positioned in corresponding grooves 20, 20'.

The first slider 5 and the second slider 6 respectively comprise first segments 105 and 106 and second segments 205 and 206 which are coaxially aligned with one and another and which, by sliding inside respective sections 3" and 4" of the first and second sliding chambers 3 and 4, control the opening and closing of a series of ports obtained in the body 2.

More specifically, in the body 2 are obtained a first and a second port 21 and 22 which communicate with the respective sections 3" and 4" via ducts 121 and 122 and with respective supply sources of pressurised oil, for example two accumulators 23 and 24, and a third and fourth ports 25 and 26 which communicate with the sections 3" and 4" via respective ducts 125 and 126 and with two independent brake circuits of an operating machine.

In a further version of valve 1, shown in the FIGS. 14 to 17, it can be noted that in the body 2 are further obtained a fifth radial port 145 and a sixth radial port 146 which communicate with the sections 3" and 4" respectively by means of respective ducts 127 and 128 and which carry pressurised oil to the brakes of the front wheels (FL) and (FR) as is described below in more detail.

In the body 2 are also obtained a fifth and a sixth ring-shaped ports 27 and 28 which communicate with the sections 3" and 4" and a seventh and a eighth ring-shaped port 29 and 30 which also communicate with the sections 3" and 4", the function of which is described below.

In the first segment 105 is obtained a first ring-shaped perimeter groove 31 and a lengthwise passage 33 parallel to the axis of the first segment 105 and leading to its ending part 305; similarly, in the corresponding first segment 106 of the second slider 6 are symmetrically obtained a second ring-shaped perimeter groove 32 and a lengthwise passage 34 parallel to the axis of the first segment 106 and leading to its ending part 306.

The first and the second ring-shaped groove 31 and are arranged to respectively open or close the fifth ring-shaped port 27 or the seventh ring-shaped port 29 and the sixth ring-shaped port 28 or the eighth ring-shaped port 30; the seventh and the eighth ring-shaped ports 29 and 30 are connected to one another via discharge ducts 35 which are in turn connected to a discharge element 135 via a common channel 235 which the ducts 35 flow into and which is connected via first offtakes 335 and second offtakes 435 to the sections 3', 4' and 3", 4" of the first sliding chamber 3 and of the second sliding chamber 4 respectively.

In the second segments 205 and 206 in turn are obtained, respectively, a third and fourth ring-shaped perimeter groove 36 and 37 which are arranged to open or close the ducts 121 or 125 and 122 or 126 alternatively.

The fifth and the sixth ring-shaped port 27 and 28 are connected to the sections 3" and 4" via a respective first independent duct 38 and a second independent duct 39 which lead into the latter near the third and fourth ring-shaped groove 36 and 37.

Between the first segments 105 and 106 and the respective second segments 205 and 206 are defined a first chamber 40 and a second chamber 41 which both the lengthwise passages 33 and 34 which connect them to the first and the second ring-shaped groove 31 and 32 and the ducts 127 and 128 lead into.

Two further third chamber 42 and fourth chamber 43 are defined in the sections 3" and 4", between the caps 9 and the corresponding ending parts of the first and the second slider 5 and 6, in which are also obtained further hollow seats 44 and 45 which the springs 46 are located in and which communicate with the third and the fourth ring-shaped grooves 36 and 37 via second passages 47 and 48.

With reference to the FIGS. 10 to 13, it can be observed that the operating conditions of the hydraulic valve 1 already shown in the corresponding FIGS. 14 to 17 are depicted schematically.

Figure 10:
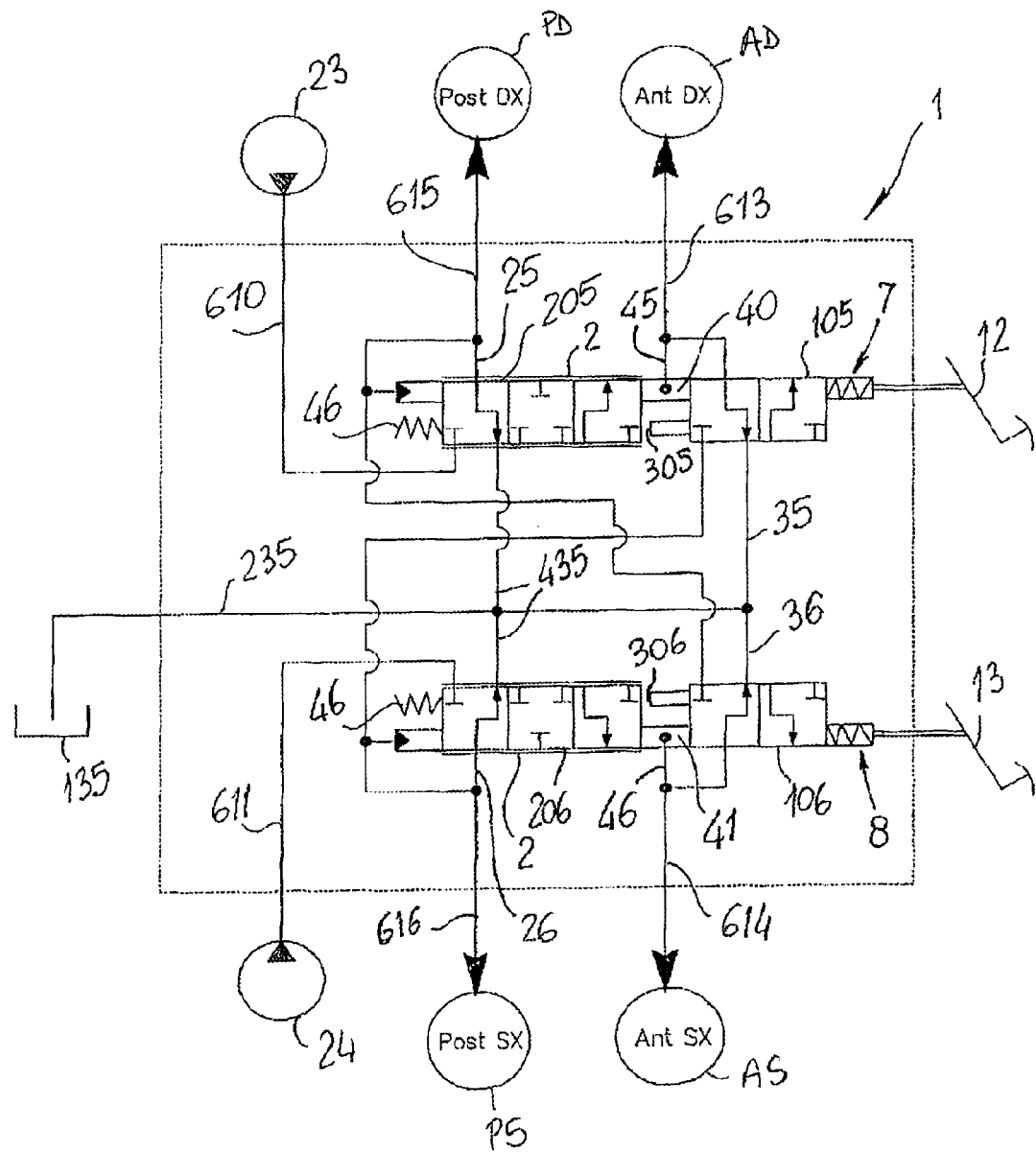
FIG. 10 is a hydraulic diagram of an operating apparatus suitable for operating first brakes on a front axle and second brakes on a rear axle of a vehicle in a stand-by condition.
Figure 14:
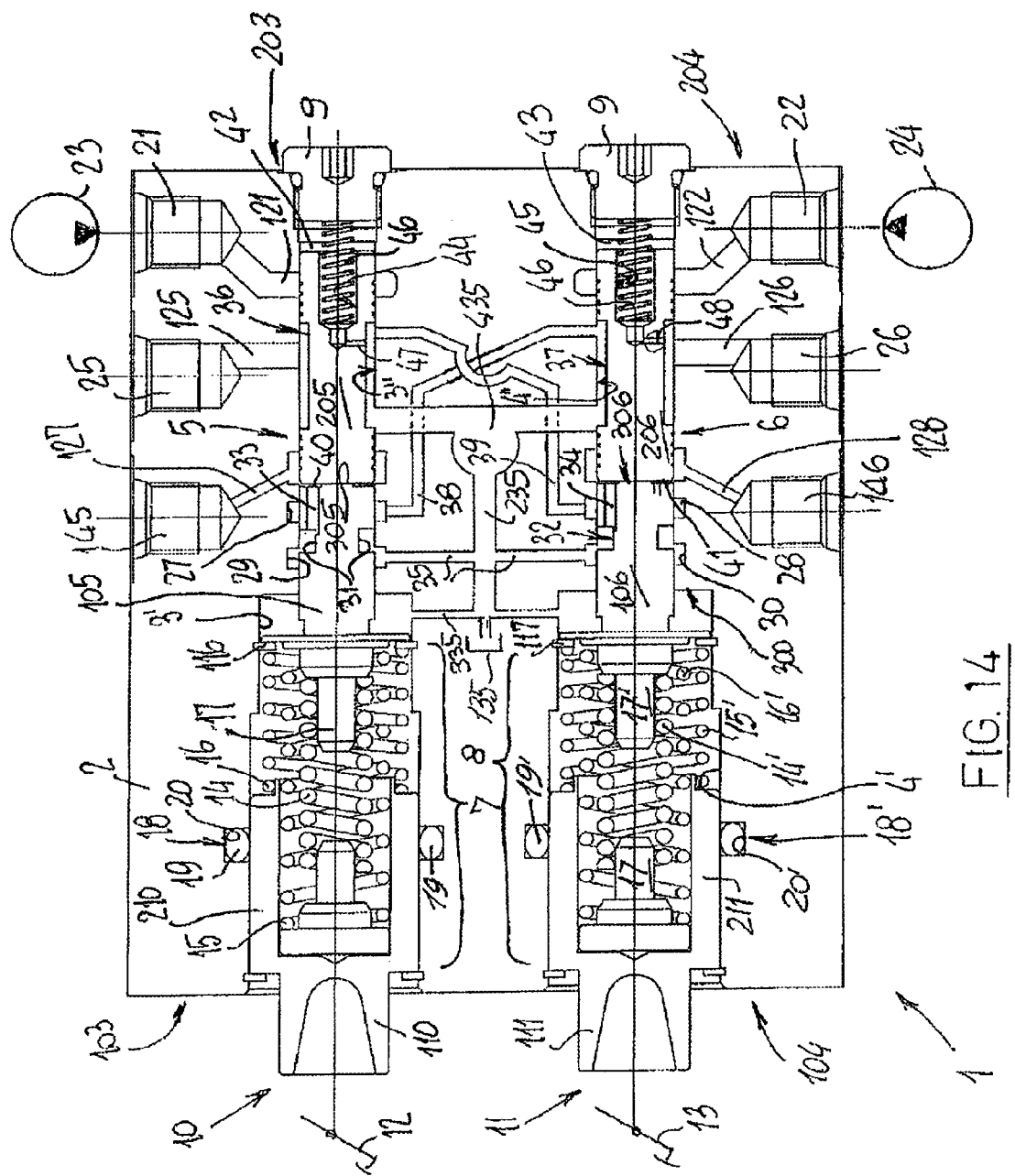
FIG. 14 is a diagram of a hydraulic valve in a second embodiment arranged to control two parallel hydraulic circuits of a braking system of an operating machine, in a standby configuration.

In more detail, in FIG. 10, which shows the hydraulic valve 1 in a standby condition equivalent to that shown in FIG. 14, it can be noted that no pressure is being applied to pedals 12 and 13 by the driver.

The two elements 23 and 24 which, as in the case shown, can normally be composed of two pumps or by two accumulators for the pressurised oil, have their respective supply lines 610 and 611 closed by the second segments 205 and 206 of the sliders 5 and 6: thus, in this configuration, no pressurised oil reaches either the braking units of the front wheels, namely left front wheel (FL) and right front wheel (FR) or the braking units on the rear wheels, namely rear left wheel (RL) and rear right wheel (RR).

The respective lines 613, 614 and 615, 616 are connected to the discharge 135 via a discharge line 235.

Figure 11:
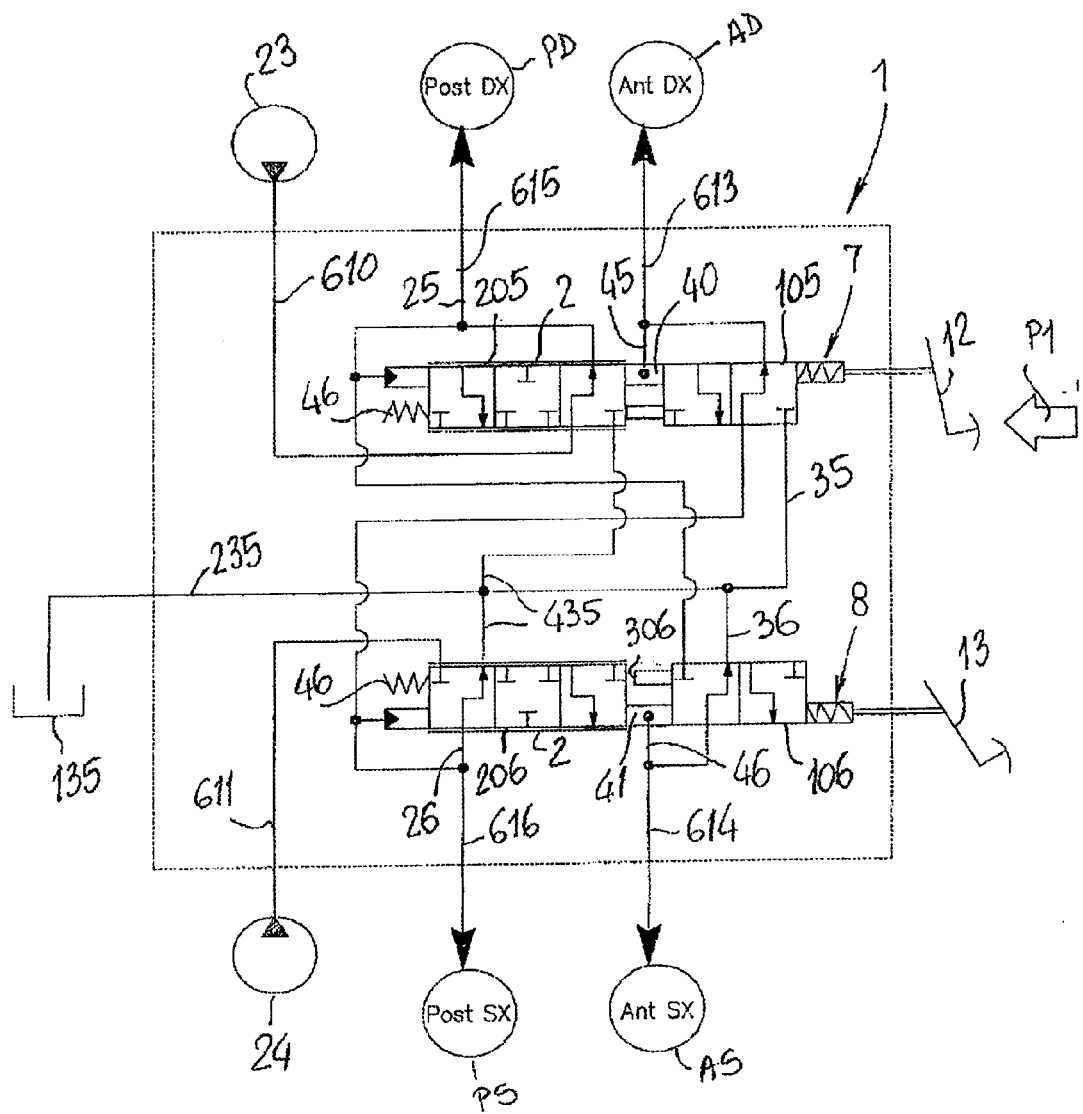
FIG. 11 is the hydraulic diagram from FIG. 10 in a braking condition with just one brake pedal of a vehicle.
Figure 15:
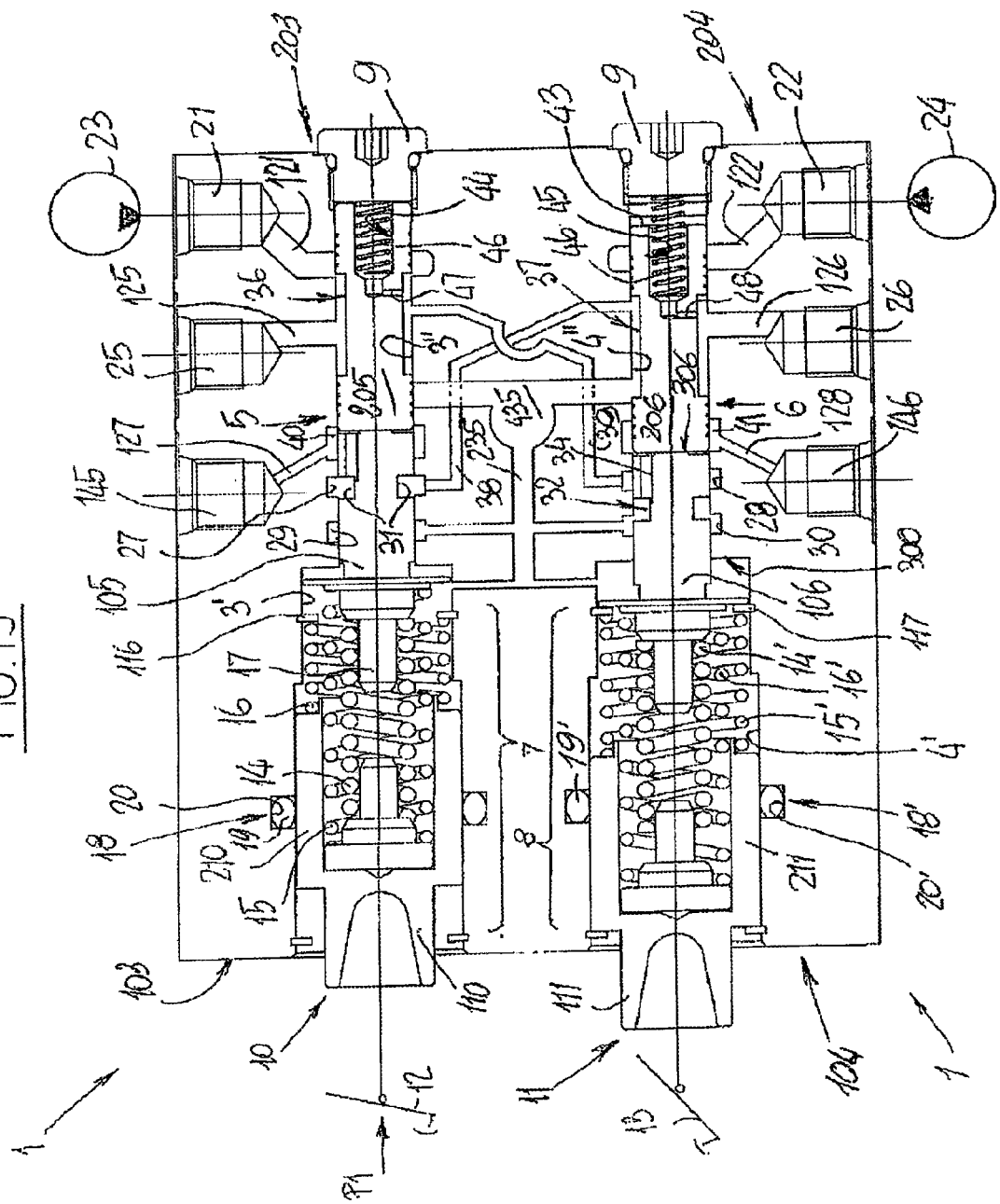
FIG. 15 is a diagram of the valve of FIG. 14 in a braking configuration with a first of the parallel hydraulic circuits.

In FIG. 11, which shows the equivalent condition to FIG. 15, it can be noted that the driver has applied a pressure "P1" to one of the brake pedals, specifically to the pedal 12.

This pressure "P1" moves the slider 5 inside its sliding seat towards the cap 9, opening the connection between the line 610 and the line 615, via the second segment 205.

In this condition, pressurised oil reaches the rear right wheel (RR) only and its brake components are activated.

The movement of slider 5, more specifically of the first segment 105 of this, also opens the connection between the duct 613 and the duct 616; however, the latter is connected to the discharge 135 and for this reason the braking units of the front right wheel (FR) and rear left wheel (RL) are not activated.

In this condition the vehicle tends to turn around the rear right wheel (RR), and the point of contact between it and the ground becomes a sort of centre of rotation.

Figure 12:
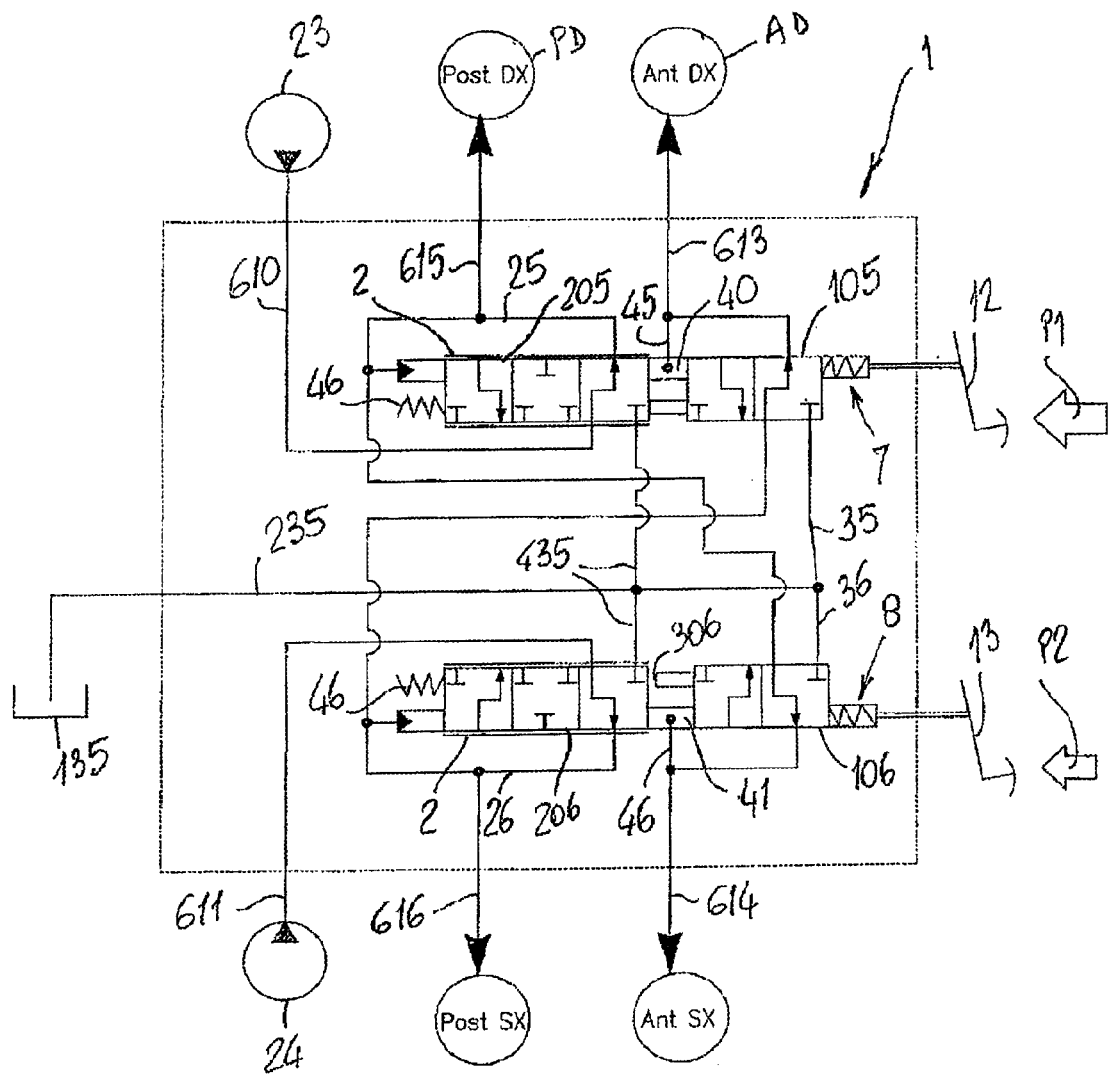
FIG. 12 is the hydraulic diagram of FIG. 11 in a braking condition with two parallel pedals of a vehicle with greater pressure applied to one pedal than the other.

If the driver continues to increase the pressure "P1" and simultaneously starts to apply a second pressure "P2" to the brake pedal 13 as well, the hydraulic valve 1 arranges itself in the configuration illustrated in FIG. 12.

In this configuration it can be noted that the connection between the two ducts 610 and 615 is open and the brake components of the rear right wheel (RR) therefore continue to be supplied with high-pressure oil.

Furthermore, due to the pressure "P2", the second segment 206 also moves towards the cap 9, opening the connection between the duct 611 and the duct 613 and, as a result, the duct 616.

At this stage the pressure "P2" remains substantially low, lower than the pressure "P1". In this condition, oil at a high pressure "P1" reaches the braking unit of the rear right wheel (RR), whereas oil at a low pressure "P2" reaches the braking unit of the rear left wheel (RL), the front right wheel (FR) and the front left wheel (FL).

Figure 13:
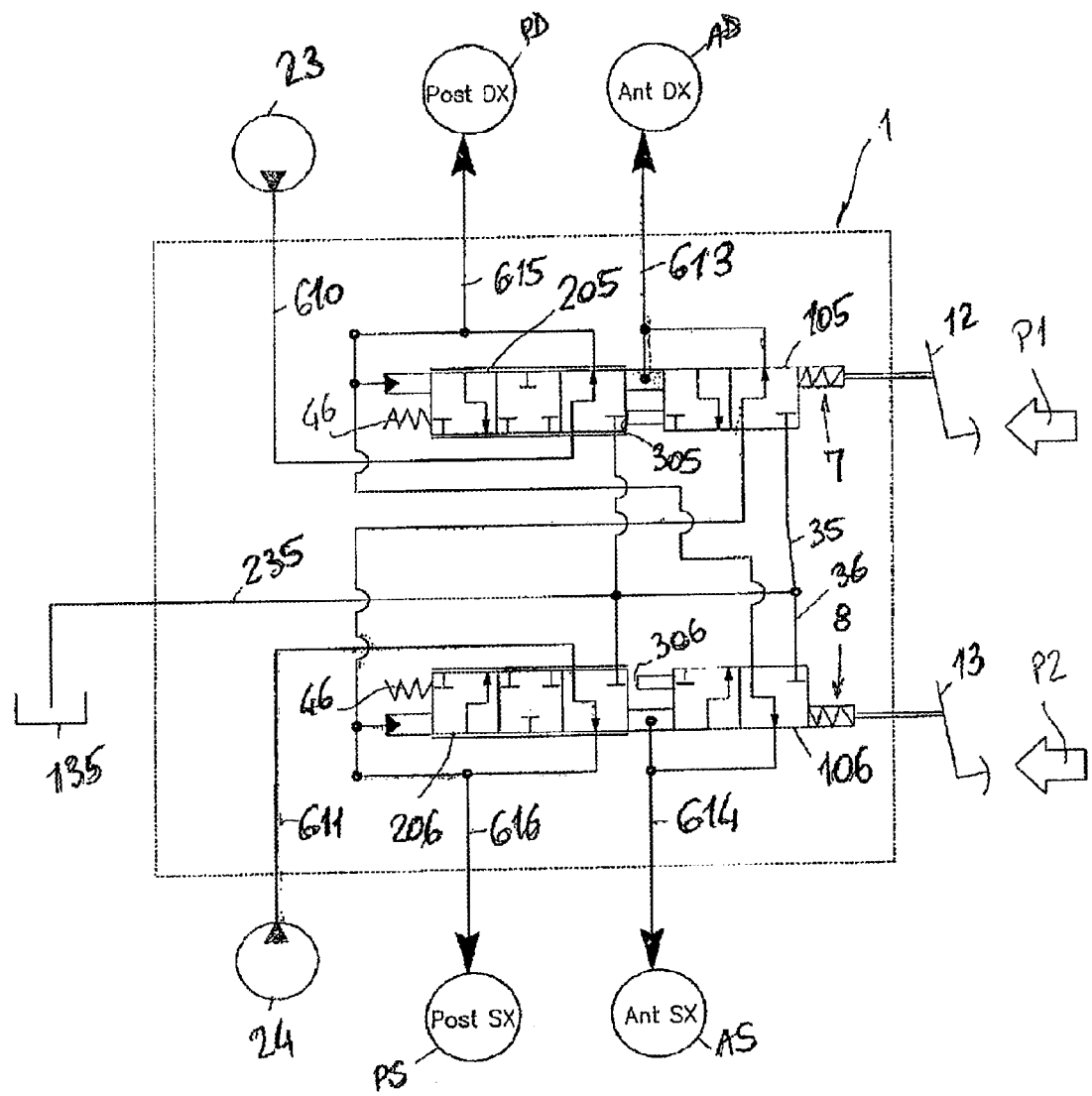
FIG. 13 is the hydraulic diagram of FIG. 12 in an emergency braking condition with substantially equal pressure applied to both pedals.

If the driver continues to press both pedals 12 and 13 with substantially the same force, that is with pressures "P1" and "P2" substantially the same as each other, the hydraulic valve 1 moves to the configuration shown in FIG. 13.

In this condition it can be noted that the connections between the lines 610, 615, 614 and between the lines 611, 616, 613 are completely open: high-pressure oil therefore reaches the braking units of the front and rear wheels and the braking action reaches its maximum level.

Note, however, that the braking force is substantially constant on both sides of the vehicle, even though there is a slight misalignment "67" between the positions of the two first segments 105 and 106.

Note, in fact, that in the configurations shown in FIGS. 11 to 13 the ending part 305 of the first segment 105 rests against the opposite ending part of the respective second segment 205, whereas the ending part 306 of the first segment 106 is slightly removed from the corresponding ending part of the respective second segment 206.

The operating apparatus 500 operates as follows: when the vehicle is in normal work conditions, for example in fields, and both the meshes 503 and 504 are working, the driver can use the vehicle's brakes both to turn it in one direction quickly and to block its forward movement.

Figure 2:
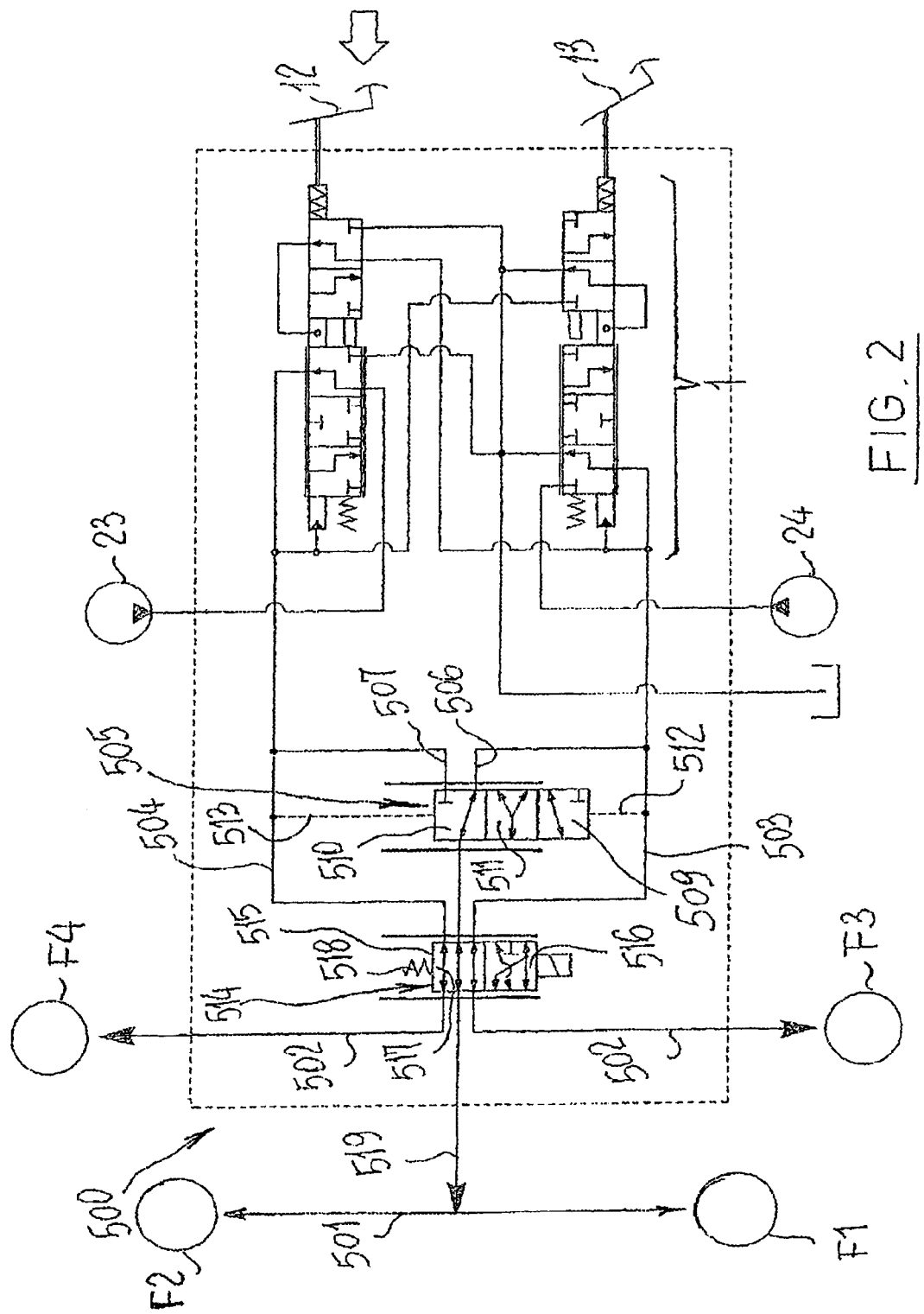
FIG. 2 is the hydraulic diagram from FIG. 1 in a braking condition with just one brake pedal of a vehicle.

In the first case the driver presses just one of the pedals, as shown in FIG. 2 where pedal 12 is pressed.

In the corresponding mesh 504 the pressure increases and the oil is driven towards the rear right wheel as you look at FIG. 2. At the same time the slider 508 of the first distributing means 505 is pushed towards the mesh 503.

This movement opens the passage of oil towards the brakes of the wheel on the front axle 501.

The second distributing means 514 are in the normal position 517 in which the two meshes 503 and 504 are connected to their respective brakes of the wheels on the rear axle 502.

In this condition, the vehicle turns around the rear right wheel for the observer and part of the oil also goes to the brakes of the wheels on the front axle 501.

A similar thing happens when the driver wants to turn to the left, by pressing the pedal 13 and increasing the pressure inside the mesh 503 and moving the slider 508 towards the mesh 504.

Figure 3:
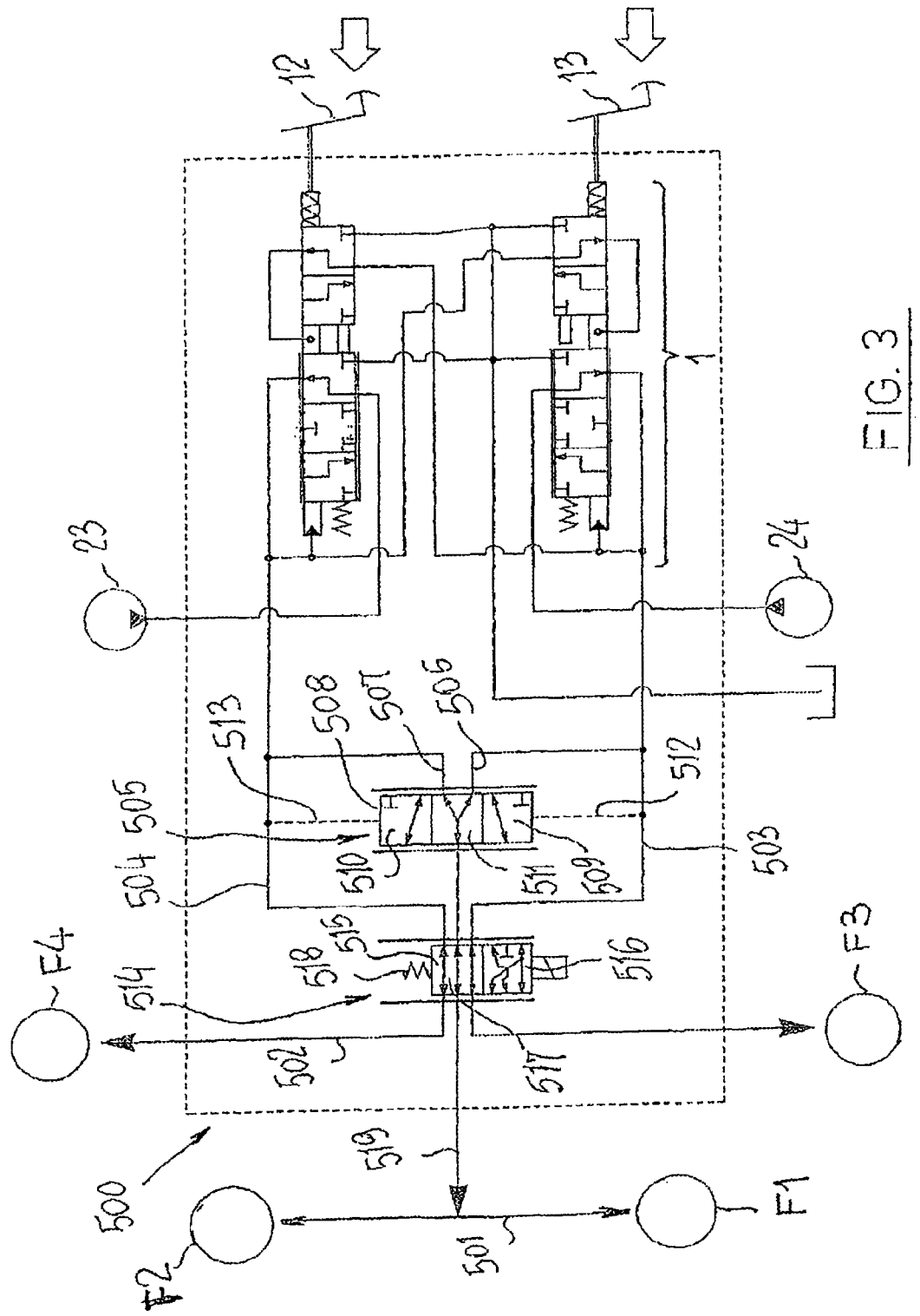
FIG. 3 is the hydraulic diagram from FIG. 2 in a braking condition with two parallel pedals of a vehicle.

When the driver wants to slow down or stop the vehicle's movement, he operates both pedals 12 and 13 simultaneously, as shown in FIG. 3.

In this case it can be noted that the slider 508 remains still as the pressures pushing on its ending parts are equal and opposite, and that the second distributing means 514 are also still in the position 517 which allows pressurised oil to pass through the meshes 503 and 504 and through a line 519 that connects to the brakes of the wheels on the front axle.

Therefore, the pressurised oil reaches the brakes of the wheels on the rear axle 502 via the meshes 503 and 504 and the brakes of the wheels on the front axle 501 via the connection line 519.

Figure 4:
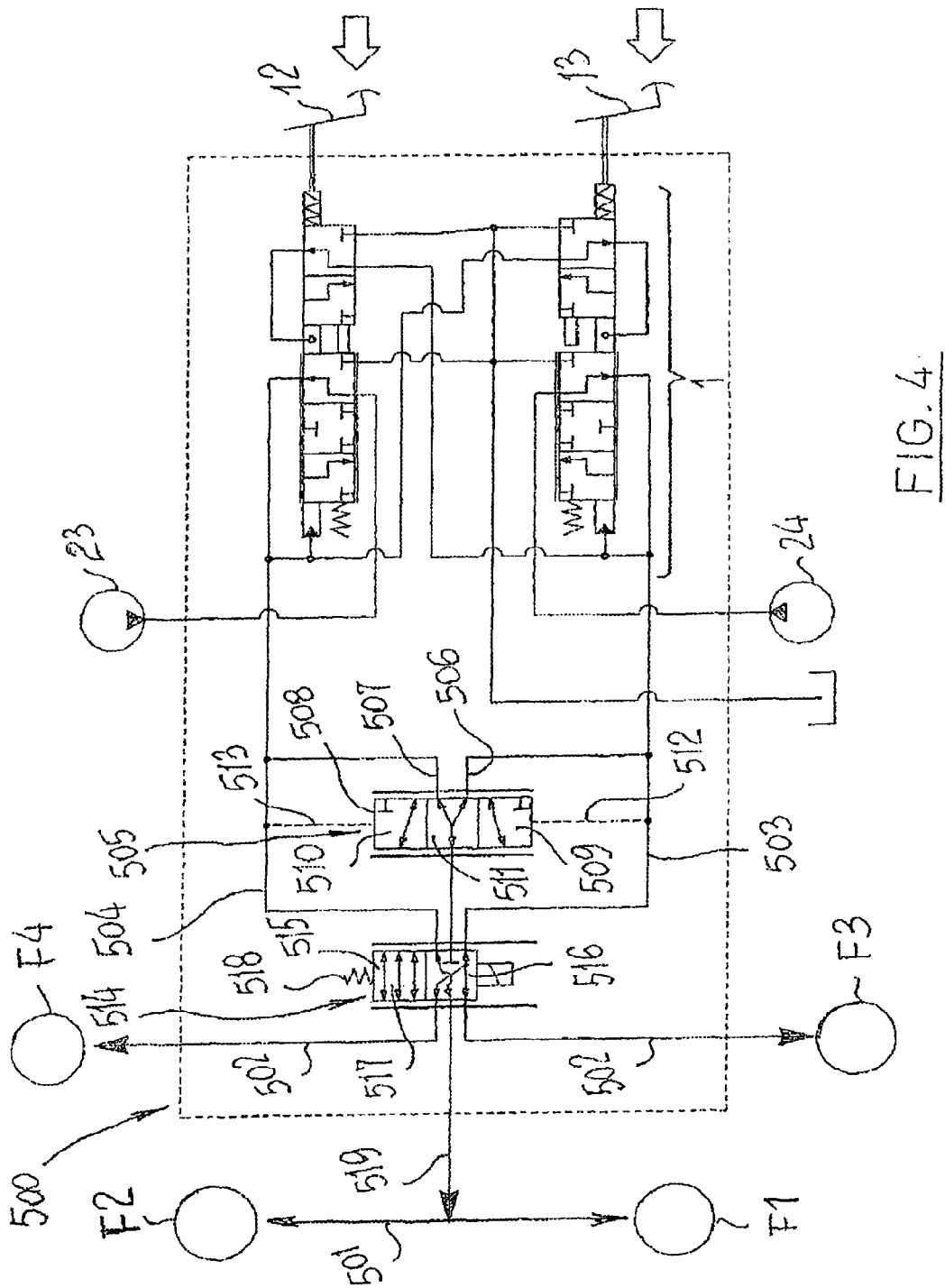
FIG. 4 is the hydraulic diagram from FIG. 3 in a running condition at a high speed.

When the vehicle is taken onto the road for fast transport, the driver operates the control that moves the slider 515, moving it towards the mesh 504 as shown in FIG. 4: in this condition, it can be seen that the mesh 503 is connected to the brakes of the wheels on the rear axle 502 whereas the mesh 504 is connected to the line 510 and, therefore, to the brakes of the wheels on the front axle 501.

In this condition, it can also be seen that the connection between the first distributing means 505 and the line 519 is interrupted, thus the first distributing means 505 cannot send oil separately to the brakes of the wheels on the rear axle 502.

In the event that the driver needs to brake in order to limit or stop the vehicle's movement, he operates on both pedals and the oil reaches both the brakes of the wheels on the front axle 501 and the brakes on the rear axle 502.

If one of the meshes 503 and 504 accidentally leaks, it can be observed that the drop in pressure in the mesh where the malfunction occurs does not completely prevent the vehicle from braking uniformly using the brakes of the wheels on at least one axle, front or rear.

Figure 5:
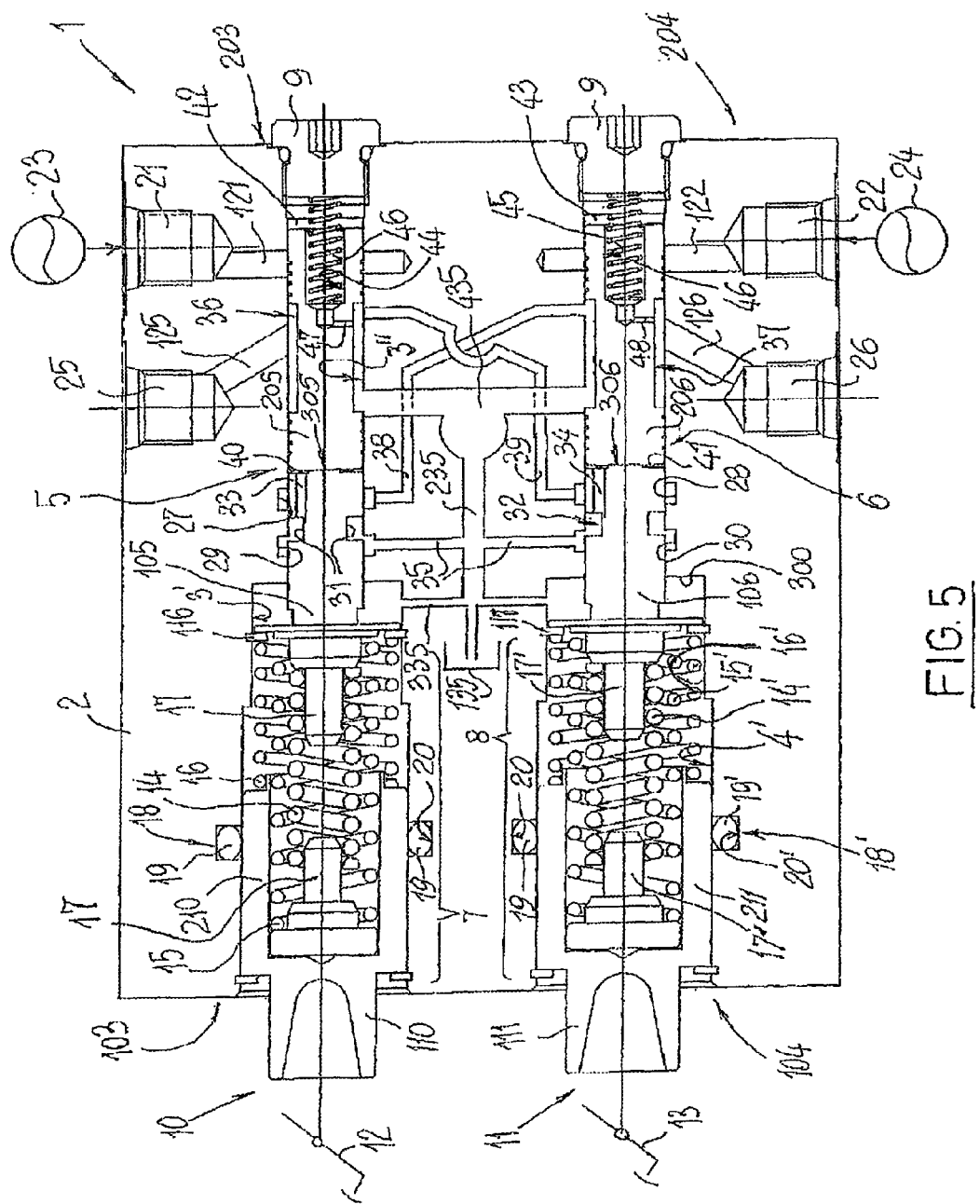
FIG. 5 is a diagram of a hydraulic valve arranged to control two parallel hydraulic circuits of a braking system of an operating machine, in a standby configuration.

In the first version the hydraulic valve 1 which sends pressurised oil to the meshes 503 and 504 works as follows: with reference to FIG. 5 the condition is shown in which the driver does not apply any force to the pedals 12 and 13 of the operating machine which does not, therefore, brake and can move freely on the roads.

In more detail, in this condition the accumulators 23 and 24 do not supply pressurised oil to the independent hydraulic circuits controlling the brakes on the left side and on the right side of the operating machine, as the ducts 121 and 122 of the first ports 21 and 22 are closed by the respective second segments 205 and 206 of the first and of the second slider 5 and 6.

The third and fourth ports 25 and 26 are connected to a respective hydraulic circuit which controls the brakes on one side of the operating machine (the left-hand circuit and the right-hand circuit respectively) and they have no supply as they are connected to the discharge 135; as has been stated, in this condition the operating machine can move along the ground.

When the driver wishes to steer the operating machine quickly in one direction while it is moving forwards along the ground, he pushes the corresponding brake pedal which opens the pressurised oil supply to the corresponding hydraulic circuit, blocking the brakes on the side positioned towards the curve direction required.

Figure 6:
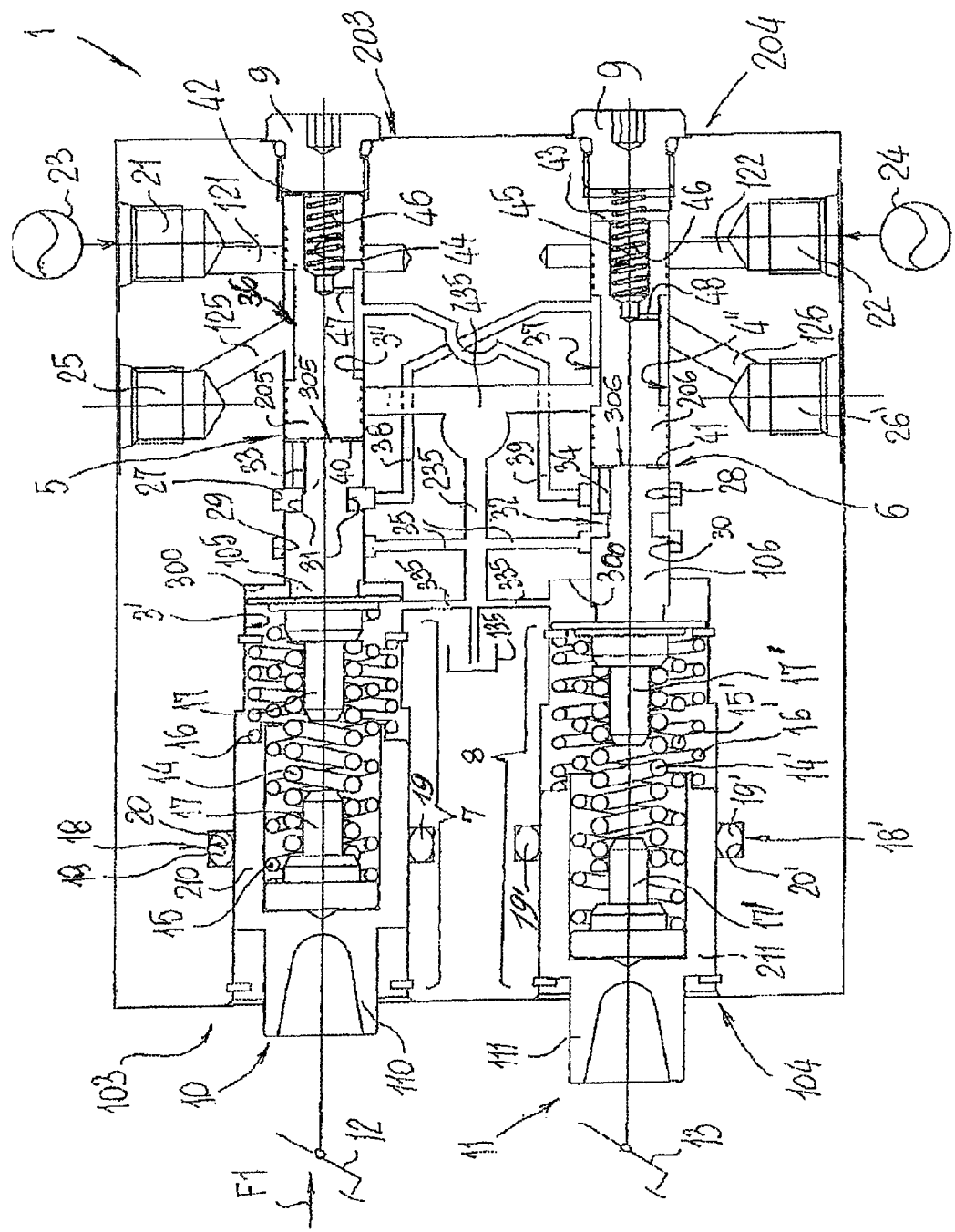
FIG. 6 is a diagram of the valve from FIG. 5 in a braking configuration with a first of the parallel hydraulic circuits.

FIG. 6 shows this condition in more detail.

As can be seen, the pedal 12 has been pressed by the driver and the first thrust unit 7 has moved axially inside the section 3' towards the inside of the body 2 of the valve 1, towards the cap 9, compressing the inner spring 14, the intermediate spring 15 and the outer spring 16.

The forward movement of the first thrust unit 7 also causes the corresponding first slider 5, inside which the first segment 105 is held against the second segment 205, to move forwards in the same direction inside the section 3" by means of the thrust of the inner spring 14 and intermediate spring 15.

The forward movement of the first slider 5 first opens the connection between the first chamber 40 and the fourth ring-shaped port 26 via the lengthwise passage 33, the fifth ring-shaped port 27, the first ring-shaped groove 31 and the fourth ring-shaped groove 37, connecting the first chamber 40 with the discharge 135; then the connection between the first port 21 and third port 25 via the third ring-shaped groove 36 also progressively opens: the pressurised oil thus passes from the accumulator 23 (or other equivalent source) to the hydraulic circuit which controls the brakes, for example on the left-hand side of the operating machine, gradually blocking them as the alignment increases, and thus the passage between the first port 21 and the third ring-shaped groove 36.

A quantity of pressurised oil also fills the second independent duct 39 without, however, having any effect at this stage as the duct is closed by the first segment 106 of the slider 6; part of the pressurised oil also reaches the other hollow seat 44 via the second passage 47, starting to flood the third chamber 42 and, together with the force of the spring 46 pre-loaded to a previously calculated value (normally limited), to counterbalance the driver's push on the pedal 12, modulating the operating force of the brake on one side.

In this condition the braking action is therefore only effective on the wheel positioned on the side supplied via the third port 25, for example the left of the operating machine, while the wheel on the other right side continues to turn which is either driven by the momentum of the operating machine or by the motor itself which, in this second case, exerts a force that is essentially produced by inertia and which, together with the blocking of the wheel on the inside of the curve, substantially makes the operating machine turn on itself towards the side where the wheel is blocked.

If, during the quick steering action described above, the driver also needs to push the brakes of the right-hand side, he will start to press the pedal 13 as well.

Figure 7:
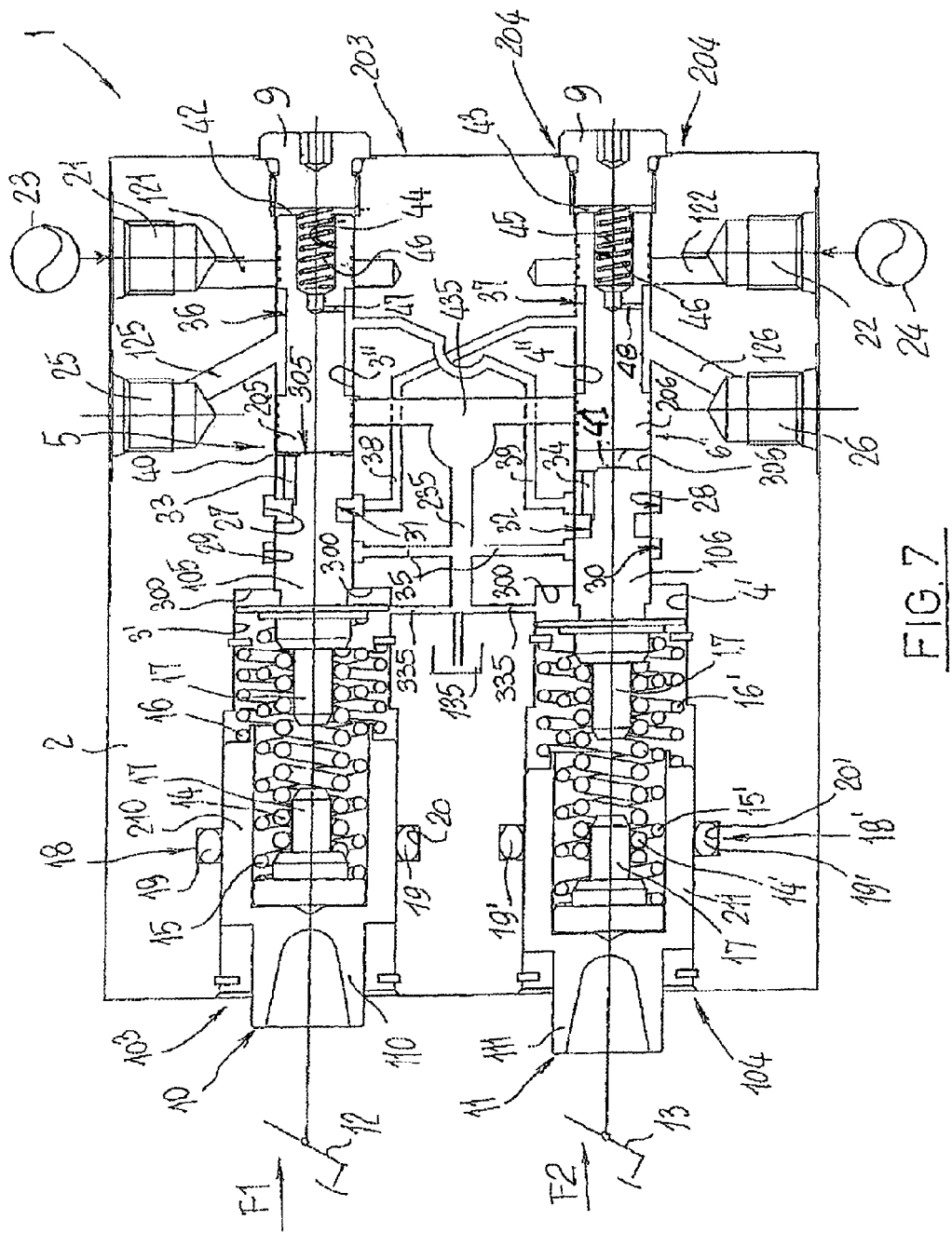
FIG. 7 is a diagram of the hydraulic valve of FIG. 6 in a start braking configuration with a second of the parallel hydraulic circuits as well.

With reference to FIG. 7 which illustrates this condition and as in the description above, the second thrust unit 8 gradually moves forwards inside the section 4' and the inner spring 14' and intermediate spring 15' push axially the first segment 106 of the slider 6 that starts to move inside the section 4" towards the cap 9.

This movement causes a leakage of pressurised oil between the second independent duct 39 and the second ring-shaped groove 32; this oil leakage passes through the lengthwise passage 34 and gradually fills the second chamber 41 defined inside the section 4" between the first segment 106 and the second segment 206.

The pressure inside this second chamber 41 gradually increases, moving the second segment 206 away from the first segment 106 of the slider 6: basically, the second segment 206 moves towards the cap 9 gradually opening the connection between the second port 22 and the fourth port 26 via the fourth ring-shaped groove 37. Thus the pressurised oil starts to flow from the accumulator 24 to the hydraulic circuit controlling the brake on the right-hand side of the operating machine, which starts to brake.

Simultaneously, via the second passage 48, a quantity of pressurised oil also reaches the other hollow seat 45 and, thus, floods the fourth chamber 43, exerting pressure on the cross section of the second segment 206 which, together with the action of the spring 46, counterbalances the driver's action on the pedal 13.

It should be noted that, although both are supplied in the condition shown in FIG. 7, the two left-hand and right-hand hydraulic circuits remain completely separate from one another as the oil supplied by the accumulator 23 cannot reach the fourth port 26 and, similarly, the oil of the accumulator 24 cannot reach the third port 25.

In this configuration the pressure of the oil in the section 3' is bigger than the pressure inside the second chamber 41 because the overall thrust of the inner spring 14' and intermediate spring 15' of the second thrust unit 8 is still limited, the force applied by the driver to the pedal 13 being limited: the pressure inside the second chamber 41 and the opposing thrust of the inner spring 14' and intermediate spring 15' brings the first segment 106 into a state of dynamic balance which, moving inside the section 4" to maintain this state of balance, this results in a modulation of the opening of the sixth port 28 on the second ring-shaped groove 32.

Figure 8:
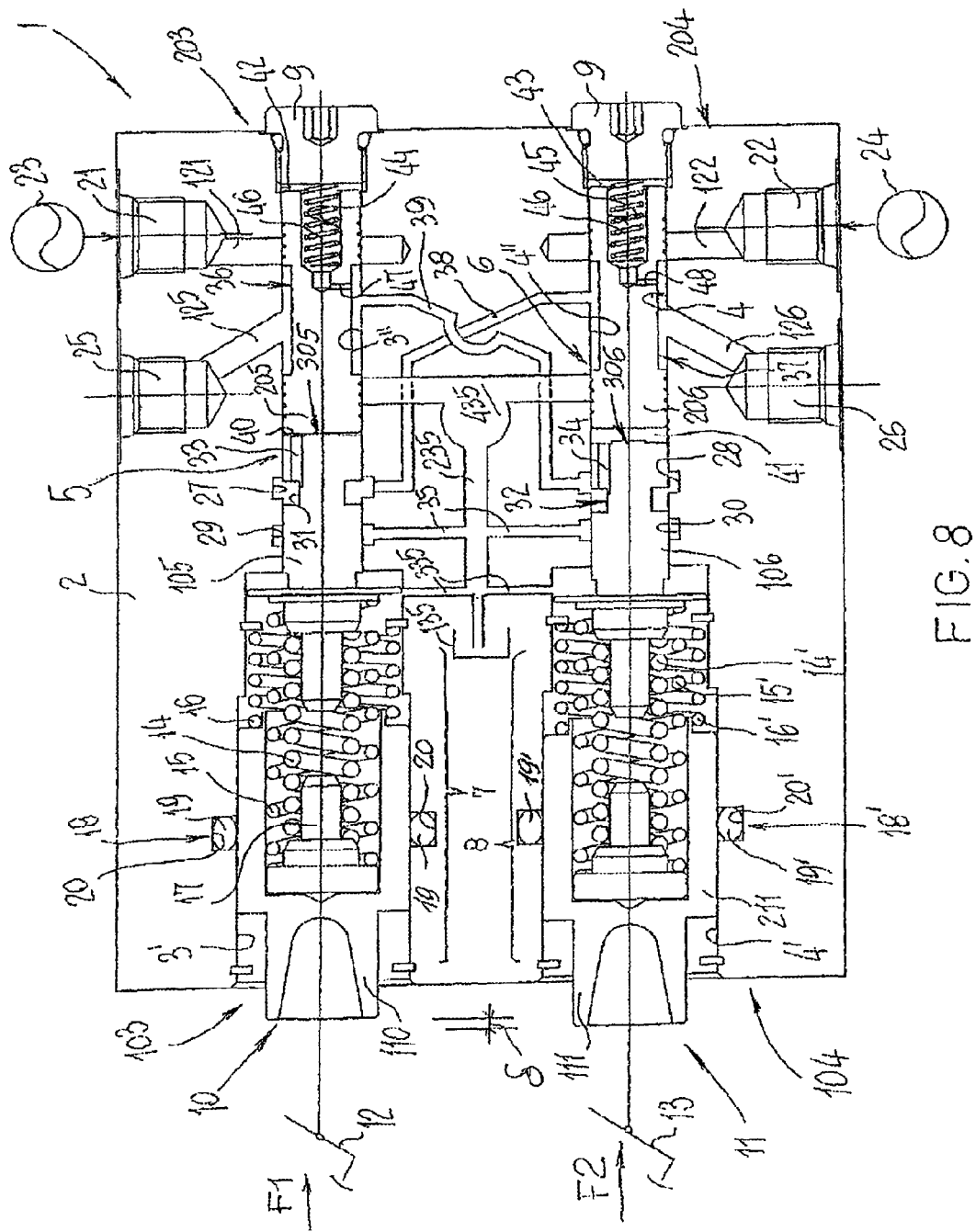
FIG. 8 is a diagram of the hydraulic valve from FIG. 7 in a braking configuration with both parallel hydraulic circuits and the pedals slightly misaligned.

If the driver increases the pressure exerted on the pedal 13, the thrust force of the inner spring 14' and intermediate spring 15' increases and causes the first segment 106 to move further towards the cap 9, as shown in FIG. 8.

This further movement opens the connection between the sixth port 28 and the second ring-shaped groove 32 definitively with no further modulation and the pressure in the second independent duct 39 is conveyed entirely into the second chamber 41 via the lengthwise passage 34.

The first segment 106 of the slider 6 is still kept balanced between the pressure exerted by the oil in the second chamber 41 and the overall thrust received from the inner spring 14' and the intermediate spring 15'.

In this condition, the pressures inside the section 3' and inside the second chamber 41 become equal as they are connected to one another via the second independent duct 39.

The gradual increase in pressure inside the second chamber 41 until it is equal to the pressure inside the section 3' causes the second segment 206 of the slider 6 to continue moving towards the cap 9.

This movement opens the connection between the duct 122, and thus between the second port 22 which leads to the accumulator 24 and the duct 126 which leads to the fourth port 26, and thus to the right brake circuit via the fourth ring-shaped groove 37; as well as moving towards the right-hand brake circuit, the pressurised oil also goes towards the fourth chamber 43 via the second passage 48, counterbalancing, together with the force of the spring 46, the thrust exerted by the pressure of the oil in the second chamber 41.

The second segment 206 of the slider 6 is in turn kept balanced between the pressure exerted on its cross section by the oil in the second chamber 41 and the pressure of the oil in the fourth chamber 43, added to the force of the spring 45.

This pressure is equal to the pressure of the oil which is sent to the left-hand brake circuit: thus, the pressures of the oil sent to the respective right and left-hand brake circuits are equal and the operating machine brakes without any imbalance or swerving.

As can be seen in FIG. 8, although the braking action in the two brake circuits is equal, the pedals 12 and 13 are not, however, perfectly aligned with one another. They are actually offset by a misalignment value "δ" due to the fact that the first segment 105 of the slider 5 is in direct contact with the second segment 205, whereas the first segment 106 of the slider 6 is kept separate from the second segment 206 by a value equal to the misalignment value "δ" present between the pedals 12 and 13, considering, as a hypothesis, that this misalignment value "δ" is exclusively caused by the condition described above and that all other errors caused by various machining tolerances of the components of the hydraulic valve are irrelevant.

In other words, the inner springs 14' and intermediate springs 15' act as automatic compensation elements for the misalignment values between the pedals 12 and 13 caused by the configurations of the first segments and second segments and also by any other differences in pressure caused by the various machining tolerances of the components.

If the driver continues to increase the pressure exerted on the pedal 13, the first segment 106 of the slider 6 slides towards the second segment 206 until it comes into contact with it: the pressure of the oil inside the seat 4 by the first segment 106 and the second segment 206 increases and exceeds the pressure inside the section 3" by the first segment 105 and the second segment 205 of the slider 5.

Figure 9:
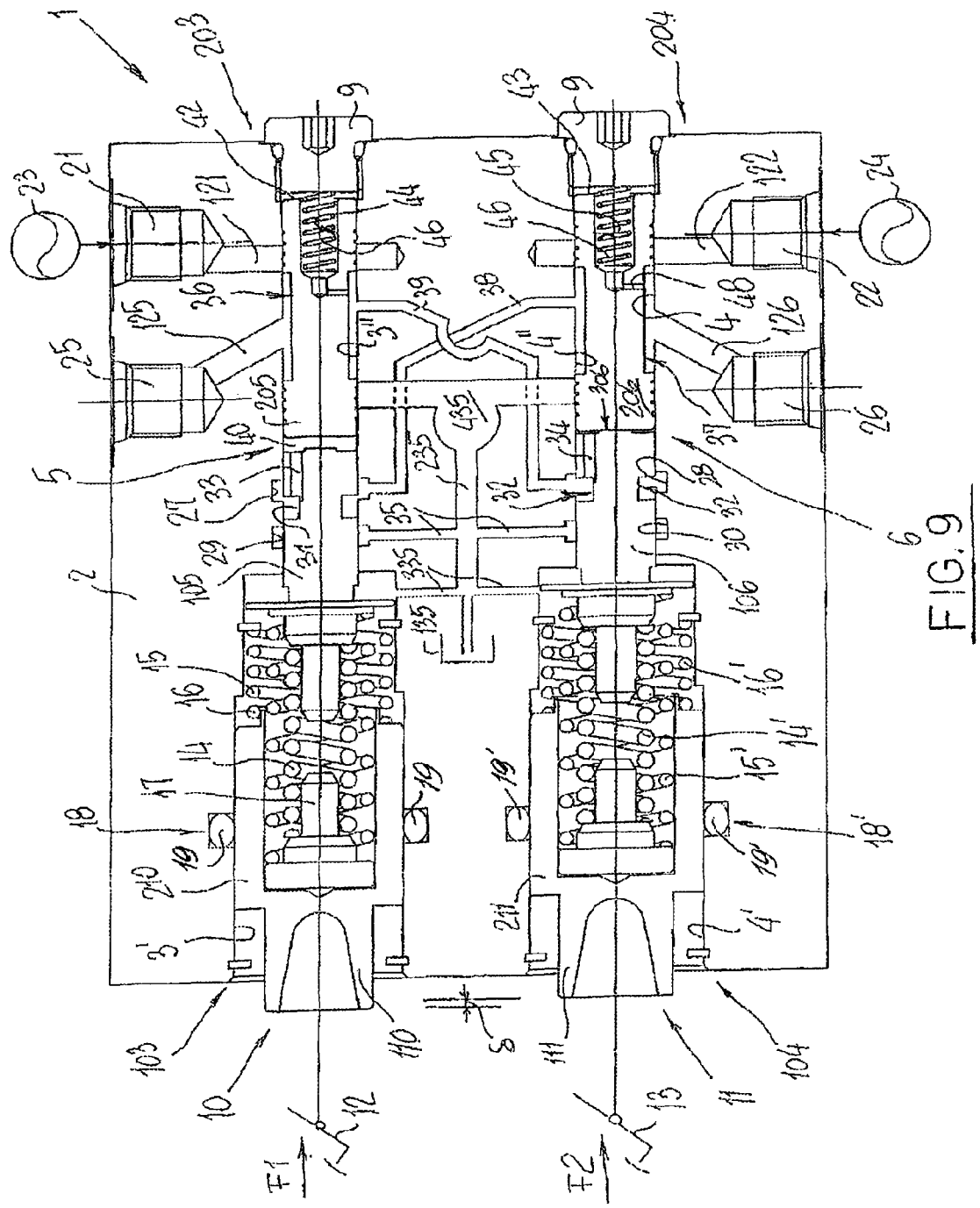
FIG. 9 is a diagram of the hydraulic valve from FIG. 8 in a braking configuration in which the pedals are misaligned in an opposite way.

Via the first independent duct 38 this higher pressure reaches the first chamber 40 defined between the first segment 105 and the second segment 205, gradually separating them from one another, as shown in FIG. 9.

The operation of valve 1 in the second version is as follows: FIG. 10 or 14 show the condition in which the driver does not apply any force to the brake pedals 12 and 13 of a vehicle, for example, a farming tractor, which does not, therefore, brake and can move freely on the roads.

In more detail, in this condition the pumps 23 and do not supply pressurised oil to the independent hydraulic circuits controlling the braking units on the left side and on the right side of the tractor, as the ducts 121 and 122 of the first ports 21 and 22 are closed by the respective second segments 205 and 206 of the first and second slider 5 and 6.

The third and fourth ports 25 and 26 are connected to a respective hydraulic circuit which controls the brakes on one side of the tractor (the left-hand circuit and the right-hand circuit respectively) and they have no supply as they are connected to the discharge 135; the fifth radial port 145 and the sixth radial port 146 are also connected to the discharge 135 and they cannot therefore send pressurised oil to the braking units of the front left (FL) wheel and front right (FR) wheel that they are connected to.

Thus, as has been stated, in this condition the tractor can move along the ground.

When the driver wishes to steer the tractor quickly in one direction while it is moving forwards along the ground, he operates the corresponding brake pedal which opens the pressurised oil supply to the corresponding hydraulic circuit, blocking the brakes on the side positioned towards the curve direction required.

FIGS. 11 and 15 show this condition in more detail.

As can be seen, the pedal 12 has been pushed by the driver and the first thrust unit 7 has moved axially inside the section 3' towards the inside of the body 2 of the valve 1, towards the cap 9, compressing the inner spring 14, the intermediate spring 15 and the outer spring 16.

The forward movement of the first thrust unit 7 also causes the corresponding first slider 5, inside which the first segment 105 is held against the second segment 205, to move forwards inside the section 3" in the same direction by means of the thrust of the inner spring 14 and intermediate spring 15.

The forward movement of the first slider 5 first opens the connection between the first chamber 40 and the fourth ring-shaped port 26 via the lengthwise passage 33, the fifth ring-shaped port 27, the first ring-shaped groove 31 and the fourth ring-shaped groove 37, connecting the first chamber 40 with the discharge 135; the fifth radial port 145 is connected to the first chamber 40 via the duct 127, the ring-shaped groove 31 and the lengthwise passage 33, and is thus connected with the discharge 135.

Thus, the connection between the first port 21 and the third port 25 via the third ring-shaped groove also progressively opens: the pressurised oil thus flows from the pump 23 to the hydraulic circuit which controls the braking unit, for example of the rear right wheel (RR) of the tractor, gradually blocking it as the alignment increases, and thus the width of the passage between the first port 21 and the third ring-shaped groove 36.

A quantity of pressurised oil also fills the second independent duct 39 without, however, having any effect at this stage as the duct is closed by the first segment 106 of the slider 6; part of the pressurised oil also reaches the other hollow seat 44 via the second passage 47, starting to flood the third chamber 42 and, together with the force of the spring 46 pre-loaded to a previously calculated value (normally limited), to counterbalance the driver's push on the pedal 12, modulating the operating force of the brake on one side.

In this condition the braking action is therefore only effective on the rear wheel positioned on the side supplied via the third port 25, for example the left side of the tractor, while the other three wheels, specifically the front left wheel (FL), the rear left wheel (RL) and the front right wheel (FR) continue to turn. They are either driven by the momentum of the tractor or by the motor itself which, in this first case, exerts a force that is essentially produced by inertia and which, together with blocking of the wheel on the inside of the curve, substantially makes the operating machine turn on itself towards the side where the wheel is blocked.

If the driver also needs to operate the brakes of the right-hand side, he will start to press the pedal 13 as well with a pressure "P2".

With reference to FIGS. 12 e 16 which illustrate this condition and as in the description above, the second thrust unit 8 gradually moves forwards inside the section 4' and the inner spring 14' and intermediate spring 15' push axially the first segment 106 of the slider 6 which then starts to move inside the section 4" towards the cap 9.

This movement causes a leakage of pressurised oil between the second independent duct 39 and the second ring-shaped groove 32; this oil leakage flows through the lengthwise passage 34 and gradually fills the second chamber 41 inside the section 4" between the first segment 106 and the second segment 206.

The pressure inside this second chamber 41 gradually increases, moving the second segment 206 away from the first segment 106 of the slider 6: basically, the second segment 206 moves towards the cap 9 gradually opening the connection between the second port 22 and the fourth port 26 via the fourth ring-shaped groove 37. Thus oil starts reaching the "P2" pressure from the pump 24 to the hydraulic circuit controlling the braking unit of the right-hand side of the operating machine, which starts to brake.

In more detail, the oil at the pressure "P2" is sent towards the braking unit of the front right wheel (FR) through the sixth radial port 146 that it is connected to, and also to the braking unit of the rear right wheel (RR) that it is connected to via the fourth port 26.

As the first segment 106 also moves towards the cap 9, the connection between the pump 23 and the duct 614 is gradually opened (seen in detail in FIG. 12) which allows oil to be sent at a temporarily low pressure to the front left wheel (FL): in this condition, therefore, the rear right wheel (RR) is supplied with oil at high pressure "P1", while the remaining rear left (RL) wheel, front right (FR) wheel and front left (FL) wheel are supplied with oil at a pressure "P2" lower than the pressure "P1".

Simultaneously, via the second passage 48, a quantity of pressurised oil also reaches the other hollow seat 45 and, thus, floods the second chamber 43, exerting pressure on the cross section of the second segment 206 which, together with the action of the spring 46, counterbalances the driver's action on the pedal 13.

Figure 16:
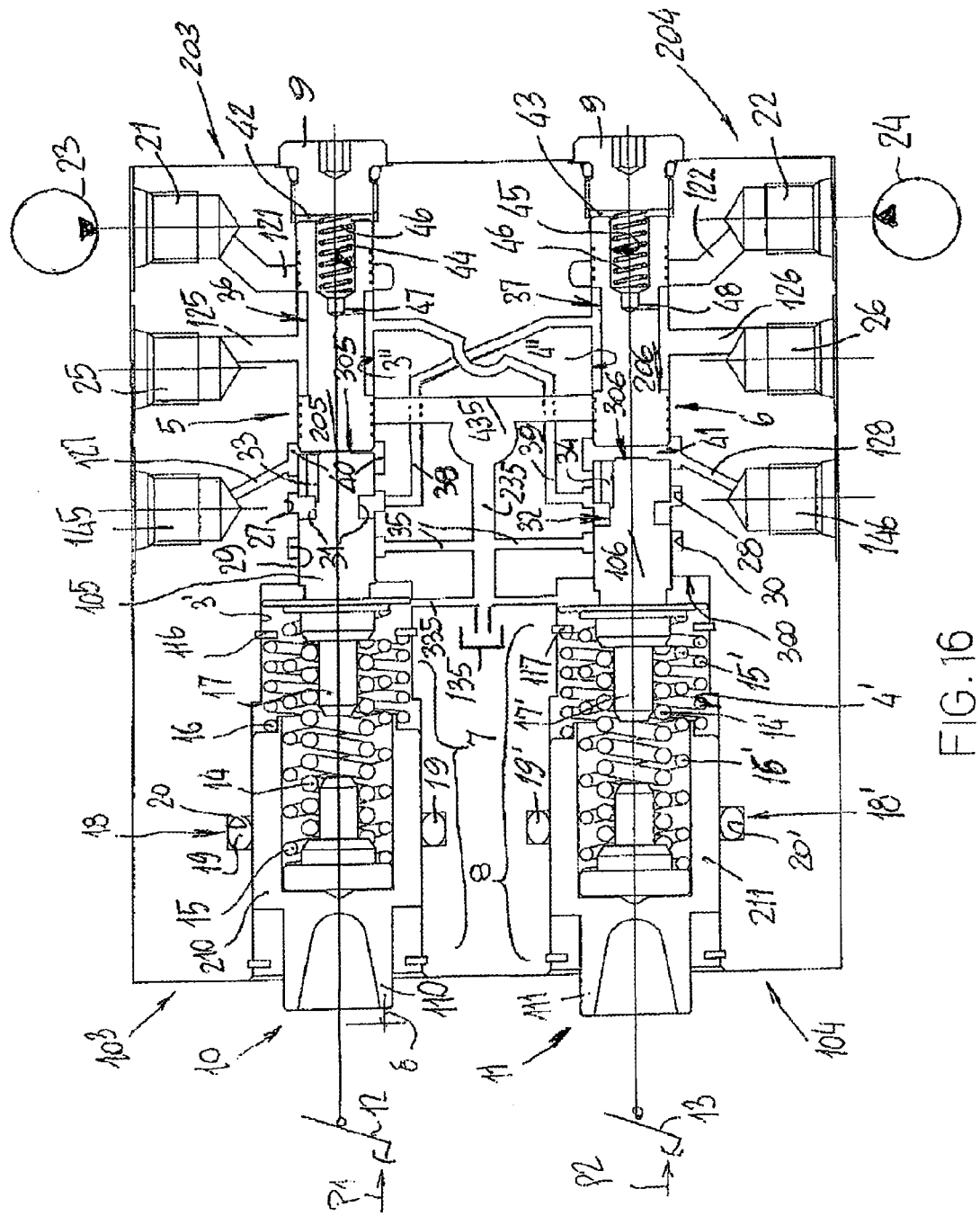
FIG. 16 is a diagram of the hydraulic valve of FIG. 15 in a start braking configuration with a second of the parallel hydraulic circuits as well.

It should be noted that, although both are supplied in the condition shown in FIG. 16, the two left-hand and right-hand hydraulic circuits remain completely separate from one another as the oil supplied by the pump 23 cannot reach the fourth port 26 and the fifth radial port 145. Similarly the oil of the pump 24 cannot reach the third port 25 and the sixth radial port 146.

In this configuration the pressure of the oil in the section 3' is bigger than the pressure inside the second chamber 41 because the overall thrust of the inner spring 14' and intermediate spring 15' of the second thrust unit 8 is still limited, the force applied by the driver to the pedal 13 being limited: the pressure inside the second chamber 41 and the opposing thrust of the inner spring 14' and intermediate spring 15' brings the first segment 106 into a state of dynamic balance that, moving inside the section 4" to maintain this state of balance, this results in the modulation of the opening of the sixth port 28 on the second ring-shaped groove 32.

Figure 17:
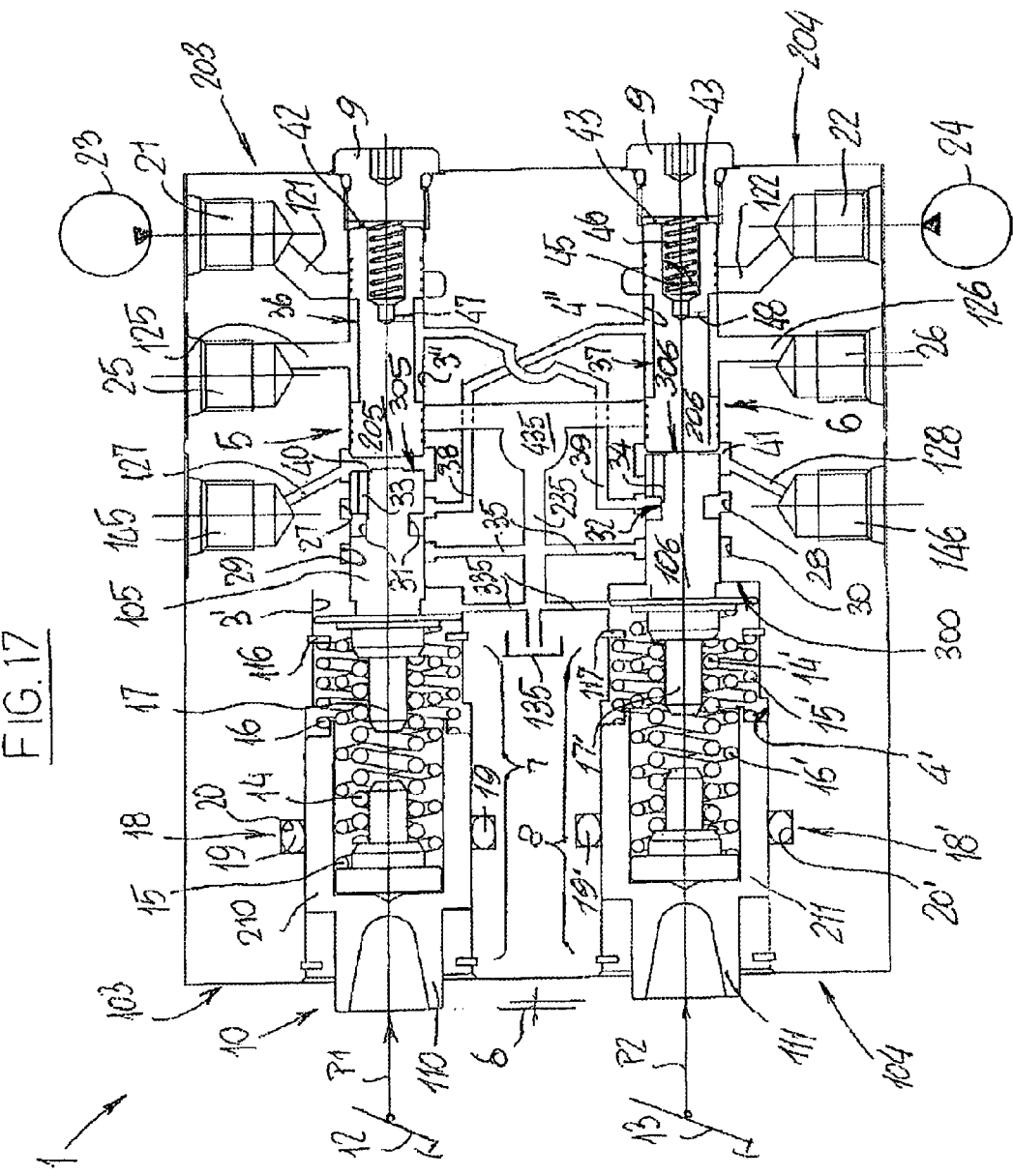
FIG. 17 is a diagram of the hydraulic valve of FIG. 16 in a braking configuration with both parallel hydraulic circuits and the pedals slightly misaligned.

If the driver increases the pressure exerted on the pedal 13, the thrust force of the inner spring 14' and intermediate spring 15' increases and causes the first segment 106 to move further towards the cap 9, as shown in FIGS. 13 and 17.

This further movement opens the connection between the sixth port 28 and the second ring-shaped groove 32 definitively with no further modulation and the pressure in the second independent duct 39 is conveyed entirely into the second chamber 41 via the lengthwise passage 34.

The first segment 106 of the slider 6 is still kept balanced between the pressure exerted by the oil in the second chamber 41 and the overall thrust received from the inner spring 14' and the intermediate spring 15'.

In this condition, the pressures inside the section 3' and inside the second chamber 41 become equal as they are connected to one another via the second independent duct 39.

The gradual increase in pressure inside the second chamber 41 until it is equal to the pressure inside the section 3' causes the second segment 206 of the slider 6 to continue moving towards the cap 9.

This movement opens the connection between the duct 122, and thus between the second port 22 which is connected to the pump 24 and the duct 126 which is connected to the fourth port 26, and thus to the braking unit of the rear left wheel (RL), via the fourth ring-shaped groove 37; as well as moving towards the braking unit of the rear left wheel (RL), the pressurised oil also goes towards the fourth chamber 43 via the second passage 48, counterbalancing, together with the force of the spring 46, the thrust exerted by the pressure of the oil in the second chamber 41.

The second segment 206 of the slider 6 is in turn kept balanced between the pressure exerted on its cross section by the oil in the second chamber 41 and the pressure of the oil in the fourth chamber 43, added to the force of the spring 45.

This pressure is equal to the pressure "P1" of the oil which is sent to the braking unit of the right rear wheel: thus, the pressures of the oil sent to the respective right and left-hand brake circuits are substantially equal and the tractor brakes without any imbalance or swerving.

As can be seen in FIG. 17, although the braking action on the two brake circuits is equal, the pedals 12 and 13 are not, however, perfectly aligned with one another. They are actually, as previously described for the first version of the valve 1, offset, in this case too, by a misalignment value "δ" due to the fact that the first segment 105 of the slider 5 is in direct contact with the second segment 205, while the first segment 106 of the slider 6 is kept separate from the second segment 206 by a value equal to the misalignment value "δ" present between the pedals 12 and 13, considering, as a hypothesis, that this misalignment value "δ" is exclusively caused by the condition described above and that all other errors caused by various machining tolerances of the components of the hydraulic valve are irrelevant.

In other words, the inner springs 14' and intermediate springs 15' act as automatic compensation elements for the misalignment value "δ" between the pedals 12 and 13 caused by the configurations of the first segments and second segments and also by any other differences in pressure caused by various machining tolerances of the components.

If the driver continues to increase the pressure exerted on the pedal 13, the first segment 106 of the slider 6 slides towards the second segment 206 until it comes into contact with it: the pressure of the oil inside the seat 4 by the first segment 106 and the second segment 206 increases and exceeds the pressure inside the section 3" by the first segment 105 and the second segment 205 of the slider 5.

Via the first independent duct 38 this higher pressure reaches the first chamber 40 defined between the first segment 105 and the second segment 205, gradually separating them from one another, as shown in FIG. 17.

Overall, it can be observed that the pressurised oil contained in the accumulator 23 only reaches the third port 25 through which the left brake circuit is supplied, whereas the pressurised oil contained in the accumulator 24 only reaches the fourth port 26 through which the right brake circuit is supplied: it is not therefore possible for the oil supplying the two circuits separately to mix. They are thus hydraulically separate.

Also in the second version of the valve 1 it can be seen that the pressurised oil sent in this case by the pump 23 only reaches the third port 25, through which the braking unit of the rear right wheel (RR) is supplied, and the sixth radial port 146 through which the braking unit of the front left wheel (FL) is supplied.

On the other hand, the pressurised oil sent by the pump 24 only reaches the fourth port 26, through which the braking unit of the rear left wheel (RL) is supplied, and the fifth radial port 145 through which the braking unit of the front right wheel (FR) is supplied: it is not therefore possible for the oil supplying the two circuits separately to mix. They are thus hydraulically separate.

For this reason, if there was an oil leak in one of the circuits, the other circuit would continue to work, providing a braking action for the operating machine anyway, even if only on one wheel of one side of the operating machine. Otherwise, if the second version of the valve 1 is fitted, with reference to the condition shown in FIG. 17, if there is an oil leak, for example in the duct 616, the pressure of the oil in this duct and in the duct 613 is completely cancelled out and the oil sent by the pump 24 is lost through the leakage in the duct 616.

However, it can be noted that the other pump 23 can continue to supply the rear right wheel (RR) via the duct 615 and the front left wheel (FL) via the duct 614, allowing the driver to brake the tractor with a crossed and essentially balanced action to avoid dangerous swerving.

Furthermore, the hydraulic valve 1 is able to provide a uniform braking action between the two left and right-hand brake circuits of an operating machine even if, for some reason, there are misalignment values between the two pedals operating the left and right-hand brakes respectively.

The invention claimed is:

1. A hydraulic valve suitable for an operating apparatus of brakes of wheels of a vehicle comprising:
    a body having a first inlet, and a second inlet;
    a supply apparatus of pressurized fluid, to which the first inlet and the second inlet are connected;
    a first outlet;
    a second outlet;
    a first hydraulic circuit that can be connected to the first outlet;
    a second hydraulic circuit that can be connected to the second outlet;
    a left-hand braking hydraulic circuit of an operating machine, the left-hand braking hydraulic circuit being supplied by the first hydraulic circuit;
    a right-hand braking hydraulic circuit of the operating machine, the right-hand braking hydraulic circuit being supplied by the second hydraulic circuit;
    a pressure compensator of said pressurised fluid in said left-hand hydraulic circuit and right-hand hydraulic circuit, the pressure compensator being between said first outlet and said second outlet;
    a first distributing device and a second distributing device located inside the body and being arranged to connect said first inlet to said first outlet and said second inlet to said second outlet respectively, each of said first distributing device and second distributing device comprising a respective first opening/closing segment and a second opening/closing segment located inside the body and being adapted for opening/closing a hydraulic connection fitted sliding into a first sliding chamber of the hydraulic valve and into a second sliding chamber of the hydraulic valve respectively;
    a first thrust unit and a second thrust unit located inside the body and being arranged to operate said first distributing device and said second distributing device respectively, said first opening/closing segment and said second opening/closing segment are operated with said first thrust unit and said second thrust unit respectively, wherein between said first distributing device and said second distributing device the hydraulic connection is provided so that said first distributing device acts on said second distributing device and vice versa.

2. The valve according to claim 1, wherein said first outlet and said second outlet are hydraulically separate.

3. The valve according to claim 1, wherein said first distributing device comprises:
a first sliding chamber obtained in said body;
a first slider fitted sliding into said first sliding chamber;
a first duct arranged to connect said first sliding chamber to said first inlet and said first outlet, said first duct being arranged to connect said first sliding chamber to said first inlet; and
a third duct arranged to connect said first sliding chamber to said first outlet, said first inlet and first outlet being controlled by said first slider, and
said second distributing device comprising:
a second sliding chamber obtained in said body;
a second slider fitted sliding in said second sliding chamber;
a second duct arranged to connect said second sliding chamber to said second inlet and said second outlet, said second duct being arranged to connect said second sliding chamber to said second inlet; and
a fourth duct arranged to connect said second sliding chamber to said second outlet, said second inlet and second outlet being controlled by said second slider.

4. The valve according to claim 3, wherein said first slider has a third perimeter groove that can be aligned with said first duct and/or third duct and wherein said second slider has a fourth perimeter groove that can be aligned with said second duct and/or fourth duct.

5. The valve according to claim 3, wherein said first sliding chamber and second sliding chamber are parallel and respectively comprise first sections having a first diameter and second sections having second diameters smaller than said first diameters, between said first diameters and said second diameters being defined by ring-shaped connection shoulders.

6. The valve according to claim 5, wherein between said first sections and said second sections a discharge is provided for said pressurised fluid.

7. The valve according to claim 5, wherein said first sliding chamber and second sliding chamber have second concordant ending parts closed with a cap and corresponding opposite open ending parts for the passage of concurrent ending parts of said first and second distributing devices, said second sections being turned towards said second concordant ending parts and said first sections being turned towards said first open ending parts.

8. The valve according to claim 7, wherein said first distributing device and said second distributing device respectively comprise a further first and a further second thrust unit fitted sliding in said first sections with the interposition of a seal and a first and a second slider placed in axial extension of said first and second thrust unit towards said cap.

9. The valve according to claim 8, wherein said first and second thrust unit respectively comprise:
first push rod elements and second push rod elements having corresponding ending parts which extend beyond said opposite first open ending parts; and
an elastic device reactive to compression placed in between said first push rod element, second push rod element and said ring-shaped shoulders.

10. The valve according to claim 9, wherein said first push rod element and second push rod element comprise respective portions protruding towards an outside of said second open ending parts and opposite portions turned towards an inside of said first sections, said portions being connectable to respective pedals that can be operated from the outside.

11. The valve according to claim 7, wherein said first inlet comprises:
a first connection duct having an ending part leading to said second section and an opposite ending part;
a first port which extends from said opposite ending part of said first connection duct and an opposite opening that can be connected to a supply apparatus (23) of pressurised fluid, said first outlet comprising a third duct having an ending part leading to said second section and an opposite ending part; and
a third port which extends from said third duct and an opposite opening that can be connected to a first hydraulic circuit,
and said second inlet comprises:
a second connection duct having an ending part leading to said second section and an opposite ending part;
a second port that extends from said opposite ending part of said second connection duct and an opposite opening which can be connected to a supply apparatus of pressurised fluid, said second outlet comprising a fourth connection duct having an ending part leading to said second section and an opposite ending part; and
a fourth port that extends from said fourth connection duct and an opposite opening which can be connected to a second hydraulic circuit.

12. The valve according to claim 7, wherein each of said first slider and said second slider comprise:
a first segment turned towards said open ending part; and
a second segment fitted coaxially to said first segment turned towards said cap and sliding in said second section, said first segment of said first and said second slider respectively coinciding with said first and second segment for opening/closing said hydraulic connection.

13. The valve according to claim 12, wherein said second section of said first sliding chamber further comprises a fifth ring-shaped port and a seventh ring-shaped port obtained by said first segment of said first slider, and
said second section of said second sliding chamber further comprising a sixth ring-shaped port and an eighth ring-shaped port obtained by said first segment of said second slider.

14. The valve according to claim 13, wherein said first segments comprise a respective first ring-shaped groove and a second ring-shaped groove arranged to connect said fifth ring-shaped port or seventh ring-shaped port and said sixth ring-shaped port or eighth ring-shaped port.

15. The valve according to claim 14, wherein said second segments respectively comprise a third ring-shaped groove and a fourth ring-shaped groove arranged to connect said first duct to said third duct and said second duct to said fourth duct.

16. The valve according to claim 15, wherein said pressure compensator comprises:
a first independent duct arranged to connect said fifth ring-shaped port to said second section of said second sliding chamber substantially by said fourth duct; and
a second independent duct arranged to connect said sixth ring-shaped port to said second section of said first sliding chamber, substantially by said third duct.

17. The valve according to claim 12, wherein between said first and second segments of said first slider and second slider, first and second chambers both with variable volume are defined.

18. The valve according to claim 17, wherein in said first segments are obtained respective lengthwise passages arranged to connect said first ring-shaped groove to said first chamber defined between said first segment and second segment of said first slider and said second ring-shaped groove to said second chamber defined between said first segment and second segment of said second slider.

19. The valve according to claim 12, wherein between said cap and facing ending parts of said second segments are respectively defined a third and a fourth chamber with variable volumes.

20. The valve according to claim 19, wherein between said facing ending parts and said cap an elastic device reactive to compression is arranged, said facing ending parts of said second segments shaping further hollow seats arranged to house and contain said flexible device.

21. The valve according to claim 20, wherein in said second segments are obtained respective third ducts having the ending parts at least indirectly connected to said further hollow seats and to said third perimeter groove and fourth perimeter groove respectively.

22. The valve according to claim 1, wherein a third outlet is located in said body that can be connected to said second inlet and said fourth outlet that can be connected to said first inlet in such a way as to selectively operate said brakes on the axles of front wheels.

23. The valve according to claim 22, wherein said third outlet is connected to said first chamber and said fourth outlet is connected to said second chamber.

24. The valve according to claim 23, wherein said third outlet is connected to said first chamber with a fifth duct and said fourth outlet is connected to said second chamber with a sixth duct.

25. A hydraulic valve suitable for an operating apparatus of brakes of wheels of a vehicle comprising:
a body having a first inlet, and a second inlet;
a supply apparatus of pressurized fluid, to which the first inlet and the second inlet;
a first outlet;
a second outlet;
a first distributing device and a second distributing device arranged to connect said first inlet to said first outlet and said second inlet to said second outlet respectively;
a first thrust unit and a second thrust unit arranged to operate said first distributing device and said second distributing device respectively,
wherein between said first distributing device and said second distributing device a hydraulic connection is provided so that said first distributing device acts on said second distributing device and vice versa,
said first distributing device comprises:
a first sliding chamber obtained in said body;
a first slider fitted sliding into said first sliding chamber;
a first duct arranged to connect said first sliding chamber to said first inlet and said first outlet, said first duct being arranged to connect said first sliding chamber to said first inlet; and
a third duct arranged to connect said first sliding chamber to said first outlet, said first inlet and first outlet being controlled by said first slider, and
said second distributing device comprising:
a second sliding chamber obtained in said body;
second slider fitted sliding in said second sliding chamber;
a second duct arranged to connect said second sliding chamber to said second inlet and said second outlet, said second duct being arranged to connect said second sliding chamber to said second inlet; and
a fourth duct arranged to connect said second sliding chamber to said second outlet, said second inlet and second outlet being controlled by said second slider,
said first sliding chamber and second sliding chamber are parallel and respectively comprise first sections having a first diameter and second sections having second diameters smaller than said first diameters, between said first diameters and said second diameters being defined by ring-shaped connection shoulders,
wherein said first sliding chamber and second sliding chamber have second concordant ending parts closed with a cap and corresponding opposite open ending parts for the passage of concurrent ending parts of said first and second distributing devices, said second sections being turned towards said second concordant ending parts and said first sections being turned towards said first open ending parts,
wherein each of said first slider and said second slider comprise:
a first segment turned towards said open ending part and
a second segment fitted coaxially to said first segment turned towards said cap and sliding in said second section, said first segment of said first and said second slider respectively coinciding with said first and second segment for opening/closing said hydraulic connection,
said second section of said first sliding chamber further comprises a fifth ring-shaped port and a seventh ring-shaped port obtained by said first segment of said first slider,
said second section of said second sliding chamber further comprising a sixth ring-shaped port and a eighth ring-shaped port obtained by said first segment of said second slider,
said first segments comprise a respective first ring-shaped groove and a second ring-shaped groove arranged to connect said fifth ring-shaped port or seventh ring-shaped port and said sixth ring-shaped port or eighth ring-shaped port,
said second segments respectively comprise a third ring-shaped groove and a fourth ring-shaped groove arranged to connect said first duct to said third duct and said second duct to said fourth duct, and
wherein a discharge comprises:
at least one discharge element;
a common connection channel of said discharge element to said second sections of said first and second sliding chamber;
first passage offtakes leaving from said common central channel and connecting to said first sections of said first and second sliding chamber;
corresponding discharge ducts leaving from said common central channel and which connect the common central channel to said second sections of said first and second sliding chamber and leading substantially by said first and second ring-shaped groove; and
second offtakes leaving from said common central channel and connecting it to said second sections of said first and second sliding chamber, leading respectively close to said third ring-shaped groove and fourth ring-shaped groove.

* * * * *